United States Patent [19]
Van Court

[11] Patent Number: 5,917,552
[45] Date of Patent: Jun. 29, 1999

[54] VIDEO SIGNAL INTERFACE SYSTEM UTILIZING DEDUCTIVE CONTROL

[75] Inventor: Thomas D. Van Court, Londonderry, N.H.

[73] Assignee: PixelVision Technology, Inc., Acton, Mass.

[21] Appl. No.: 08/626,171

[22] Filed: Mar. 29, 1996

[51] Int. Cl.$^6$ .................................................. H04N 5/46
[52] U.S. Cl. .................................... 348/558; 348/555
[58] Field of Search ................................ 348/556, 558, 348/554, 555, 557, 511, 792, 180, 194, 731, 725, 726, 552; H04N 5/46

[56] References Cited

U.S. PATENT DOCUMENTS

| | | | |
|---|---|---|---|
| 4,567,515 | 1/1986 | Schumacher | 358/107 |
| 4,872,054 | 10/1989 | Gray et al. | 358/140 |
| 4,881,121 | 11/1989 | Judge | 358/10 |
| 4,941,035 | 7/1990 | Judge | 358/10 |
| 4,956,707 | 9/1990 | Oakley et al. | 358/140 |
| 5,027,205 | 6/1991 | Avis et al. | 358/140 |
| 5,034,817 | 7/1991 | Everett, Jr. | 358/160 |
| 5,046,107 | 9/1991 | Iwamatsu | 381/107 |
| 5,115,311 | 5/1992 | Jaqua | 358/140 |
| 5,142,204 | 8/1992 | Gornati et al. | 315/364 |
| 5,146,336 | 9/1992 | Tessier et al. | 358/183 |
| 5,166,779 | 11/1992 | Moyer | 358/10 |
| 5,181,111 | 1/1993 | Hedley et al. | 358/140 |
| 5,200,749 | 4/1993 | Crosby et al. | 341/87 |
| 5,204,662 | 4/1993 | Oda et al. | 340/825.25 |
| 5,227,863 | 7/1993 | Bilbrey et al. | 358/22 |
| 5,229,853 | 7/1993 | Myers | 358/140 |
| 5,229,855 | 7/1993 | Siann | 358/183 |
| 5,280,397 | 1/1994 | Rhodes | 360/36.2 |
| 5,291,275 | 3/1994 | Lumelsky | 348/441 |
| 5,327,243 | 7/1994 | Maietta et al. | 348/565 |
| 5,341,217 | 8/1994 | Florsek | 348/529 |
| 5,343,251 | 8/1994 | Nafeh | 348/571 |
| 5,353,119 | 10/1994 | Dorricott et al. | 348/446 |
| 5,369,444 | 11/1994 | Ersoz et al. | 348/598 |
| 5,384,667 | 1/1995 | Beckwith | 360/33.1 |
| 5,389,963 | 2/1995 | Lepley et al. | 348/7 |
| 5,434,590 | 7/1995 | Dinwiddie, Jr. et al. | 345/115 |
| 5,703,657 | 12/1997 | Maruoka et al. | 348/554 |
| 5,717,467 | 2/1998 | Shiki | 348/511 |

Primary Examiner—Michael Lee
Attorney, Agent, or Firm—Weingarten, Schurgin, Gagnebin & Hayes LLP

[57] ABSTRACT

A video signal interface system for displaying video signals from various sources utilizing a deductive control technique for processing a video signal in response to measured characteristics associated the video signal. The measured characteristics are compared to stored characteristics associated with known video sources and to stored characteristics associated with previously processed video sources in order to obtain stored tuning settings associated with the respective video source. In the event that the measured characteristics do not match any of the stored characteristics, the measured characteristics are stored in memory to identify the new video source. The tuning settings in association with each video source are user adjustable.

13 Claims, 14 Drawing Sheets

!! Composite sync counting & timing logic

300 ~ HSyncCnt ←– 0
302 ~ FieldCnt ←– 0
304 ~ PolarityCnt ←– 0

!! Select some future time by which the entire counting/timing task should have completed.
306 ~ GiveUpTime ←– CURRENT_TIME + (2 X MaxSupportedFieldTime)

!! Assume we just walked into the middle of a pulse. Wait for this first partial pulse to pass.
308 ~ PreviousHalf ←– HALF_SYNC         !! Pick up the current half-speed sync value !! Just idle until we see the start of a line time, but don't wait forever.
310 ~ while (PreviousHalf = HALF_SYNC) AND (CURRENT_TIME <= GiveUpTime)
312 ~     endwhile                       !! No action yet, just waiting !! Now we're at the beginning of the first whole composite sync pulse. Find the Polarity.
315 ~ PreviousHalf ←– HALF_SYNC         !! Pick up the current half-speed sync value
      while (PreviousHalf = HALF_SYNC) AND (CURRENT_TIME <= GiveUpTime)
          if SYNC_LEVEL = 1              !! Add up the time spent high and low.
316 {         then PolarityCnt ←– PolarityCnt + 1  !! Mostly-high means an active-low pulse
              else PolarityCnt ←– PolarityCnt - 1  !! Mostly-low means an active-high pulse
      endwhile for N from 1 to 3                  !! Look for three changes of pulse polarity
          if CURRENT_TIME > GiveUpTime   !! Make sure this doesn't take an unreasonable
              then exitloop              !! amount of time to complete.

PreviousPolarity ←– PolarityCnt
          while sgn(PreviousPolarity = sgn(PolarityCnt)) !! Keep looking until polarity changes.
              if CURRENT_TIME > GiveUpTime             !! Make sure this doesn't take an unreasonable
                  then exitloop                         !! amount of time to complete.

320 {     PolarityCnt ←– 0                !! Polarity-test a new pulse
          PreviousHalf ←– HALF_SYNC       !! Measure polarity of this pulse.
          while (PreviousHalf = HALF_SYNC) AND (CURRENT_TIME <= GiveUpTime)
              if SYNC_LEVEL = 1
322 {             then PolarityCnt ←– PolarityCnt + 1
                  else PolarityCnt ←– PolarityCnt - 1
          endwhile 318 {     HSyncCnt ←– HSyncCnt + 1        !! Count up the pulses we've seen.
          endwhile 324 ~ VEdgeTime.N ←– CURRENT_TIME        !! Keep separate stats for each VSync edge we see
326 ~ VEdgeHCnt.N ←– HSyncCnt 328 ~ FieldCnt ←– FieldCnt + INTERLACE   !! Total the field values at each VSync edge time
      endfor

*FIG. 5*

!! Composite sync counting & timing logic - continued.

330 { !! If CURRENT_TIME > GiveUpTime, that means the information-gathering process took far longer
     !! than was reasonable for any realistic signal. HSyncCnt much greater than 0 indicates a VESA DPMS
     !! state, otherwise there appears not to be a valid signal at the input.

332 { !! If CURRENT_TIME <= GiveUpTime, then the counting/timing process completed normally and found a
     !! complete field of video. Proceed with the rest of the analysis.

334 { !! At this point, FieldCnt is some value 0-3.
     !!   1 and 2 indicate a changing field ID value, i.e. interlace.
     !!   0 and 3 indicate an unchanging field value, i.e. progressive scan 336 { !! if (VEdgeHCnt.3 - VEdgeHCnt.2) and (VEdgeHCnt.2 - VEdgeCnt.1) are both > 1,
     !!   then the signal has serration 338 { !! The total field time is (VEdgeTime.3 - VEdgeTime.1)
     !! The total number of HSync pulses seen is (VEdgeHCnt.3 - VEdgeHCnt.1)

340 { !! if (VEdgeTime.3 - VEdgeTime.2) > (VEdgeTime.2 - VEdgeTime.1)
     !!   then the 1-2 interval was shorter and a negative polarityCnt indicates active low SYNC pulses
     !!   else the 2-3 interval was shorter and a negative polarityCnt indicates active low SYNC pulses

*FIG. 5A*

$t_0$    344   GiveUpTime = $t_0$ + 2 (MaxSupportedFieldTime)

$t_0 - t_1$   346   PreviousHalf = 0

$t_1 - t_2$   348 { PreviousHalf = 1
PolarityCnt = -1, 0, 1, 2, 3

$t_2 - t_3$   350 { PreviousPolarity = 3
PolarityCnt = 0
PreviousHalf = 0
PolarityCnt = -1, 0, 1, 2, 3
HSyncCnt = 1

$t_3 - t_4$   352 { PolarityCnt = 0
PreviousHalf = 1
PolarityCnt = -1, 0, 1, 2, 3
HSyncCnt = 2

$t_4 - t_5$   354 { PolarityCnt = 0
PreviousHalf = 0
PolarityCnt = -1, -2, -3, -4, -3
HSyncCnt = 3

356 { VEdgeTime .1 = $t_5$
VEdgeHCnt .1 = 3
FieldCnt = 0

$t_5 - t_6$   358 { PreviousPolarity = -3
PolarityCnt = 0
PreviousHalf = 1
PolarityCnt = -1, -2, -3, -4, -3
HSyncCnt = 4

$t_6 - t_7$   362 { PolarityCnt = 0
PreviousHalf = 0
PolarityCnt = -1, -2, -3, -4, -3, -2
HSyncCnt = 5

$t_7 - t_8$   364 { PolarityCnt = 0
PreviousHalf = 1
PolarityCnt = -1, 0, 1
HSyncCnt = 6

370 { VEdgeTime .2 = $t_8$
VEdgeHCnt .2 = 6
FieldCnt = 1

$t_8 - t_9$   372 { PreviousPolarity = 1
PolarityCnt = 0
PreviousHalf = 0
PolarityCnt = -1, 0, 1, 2, 3, -1, 0, 1, 2, 3...-1, 0, 1, 2, 3
HSyncCnt = 300

$t_9 - t_{10}$   374 { PolarityCnt = 0
PreviousHalf = 1
PolarityCnt = -1, -2, -3, -4, -3
HSyncCnt = 301

376 { VEdgeTime .3 = $t_{10}$
VEdgeHCnt .3 = 301
FieldCnt = 2

*FIG. 6A*

!! Separate-sync counting and timing logic

!! Clear all the counters
400 {
  HSyncCnt ← 0                           !! Number of HSync pulses seen
  FieldCnt ← 0                             !! Total of interlace indications seen
  HPolTotal ← 0                         !! Total of HSync polarity values seen
  VPolarity ← 0                          !! Polarity counter for VSync
}

402 !! Select some future time by which the entire counting/timing task should have completed.
     GiveUpTime ← CURRENT_TIME + (2 X MaxSupportedFieldTime)

404 !! Assume we just walked into the middle of a line time. Wait for this first partial line to pass.
     PreviousHalf ← HALF_SYNC          !! Pick up the current half-speed sync value !! Just idle until we see the start of a line time, but don't wait forever.
406 {
  while (PreviousHalf = HALF_HSYNC) AND (CURRENT_TIME <= GiveUpTime)
  endwhile                                      !! No action yet, just waiting
} for N from 1 to 3                          !! Look for three VSYNC edges
412 { if CURRENT_TIME > GiveUpTime     !! Make sure this doesn't take an unreasonable
     then exitloop                          !!  amount of time to complete.

413 { HPolarity ← 0                      !! Polarity-test a new pulse
     PreviousHalf ← HALF_HSYNC       !! Measure polarity of this pulse.

414 PreviousVert ← VSYNC_LEVEL
    while PreviousVert = VSYNC_LEVEL   !! Keep looking until VSync changes.
420 { if CURRENT_TIME > GiveUpTime   !! Make sure this doesn't take an unreasonable
     then exitloop                    !!  amount of time to complete.

if PreviousHalf ≠ HALF_HSYNC then   !! See whether a line time ended
426 { if VSYNC_LEVEL = 1            !! VSync polarity measurement, once per line
     then VPolarity ← VPolarity + 1
     else VPolarity ← VPolarity - 1
410 {
428 { if HPolarity > 0                !! Overall total of HSync polarity
418    then HPolTotal ← HPolTotal + 1
     else HPolTotal ← HPolTotal - 1

424 { HSyncCnt ← HSyncCnt + 1   !! Add this line to the total line count
430 { HPolarity ← 0              !! Restart polarity count for the new pulse.
     PreviousHalf ← HALF_HSYNC   !! Restart polarity
    endif                               !! All done handling end of line 432 { if HSYNC_LEVEL = 1            !! Polarity counting for the current line
     then HPolarity ← HPolarity + 1
     else HPolarity ← HPolarity - 1
    endwhile 440 VEdgeTime.N ← CURRENT_TIME   !! Keep separate stats for each VSync edge we see
444 VEdgeHCnt.N ← HSyncCnt
448 FieldCnt ← FieldCnt + INTERLACE   !! Total the field values at each VSync edge time
    endfor

*FIG. 7*

!! Separate-sync counting and timing logic - continued

450 { !! If CURRENT_TIME > GiveUpTime, that means the information-gathering process took far longer
!! than was reasonable for any realistic signal. HSyncCnt much greater than 0 indicates
!! a VESA DPMS state, otherwise there appears not to be a valid signal at the input.

452 { !! At this point, FieldCnt is some value 0-3.
!! 1 and 2 indicate a changing field ID value, i.e. interlace.
!! 0 and 3 indicate an unchanging field value, i.e. progressive scan 454 { !! if (VEdgeHCnt.3 - VEdgeHCnt.2) and (VEdgeHCnt.2 - VEdgeHCnt.1) are both > 1,
!! then the signal has serration 456 { !! The total field time is (VEdgeTime.3 - VEdgeTime.1)
!! The total number of HSync pulses seen is (VEdgeHCnt.3 - VEdgeHCnt.1)

458 { !! Negative of VPolarity indicates VSync polarity
!! Negative of HPolTotal indicates HSync polarity

*FIG. 7A*

$t_0$ 460 — GiveUpTime = $t_0$ + 2 (MaxSupportedFieldTime)
462
$t_0 - t_1$ — PreviousHalf = 0

$t_1$ 464 $\begin{cases} \text{HPolarity} = 0 \\ \text{PreviousHalf} = 1 \\ \text{PreviousVert} = 1 \end{cases}$ $t_1 - t_2$ 466 $\begin{cases} \text{(Skip steps 424)} \\ \text{HPolarity} = -1, 0, 1, 2, 3 \end{cases}$ $t_2 - t_3$ 468 $\begin{cases} \text{VPolarity} = 1 \\ \text{HPolTotal} = 1 \\ \text{HSyncCnt} = 1 \\ \text{HPolarity} = 0 \\ \text{PreviousHalf} = 0 \end{cases}$ 470 — HPolarity = -1, 0, 1, 2, 3

$t_3 - t_4$ 472 $\begin{cases} \text{VPolarity} = 2 \\ \text{HPolTotal} = 2 \\ \text{HSyncCnt} = 2 \\ \text{HPolarity} = 0 \\ \text{PreviousHalf} = 1 \end{cases}$ 474 — HPolarity = -1, 0, 1, 2, 3

476 $\begin{cases} \text{VEdgeTime.1} = t_4 \\ \text{VEdgeHCnt.1} = 2 \\ \text{FieldCnt} = 0 \end{cases}$ $t_4$ 478 $\begin{cases} \text{HPolarity} = 0 \\ \text{PreviousHalf} = 1 \\ \text{PreviousVert} = 0 \end{cases}$ $t_4 - t_5$ 480 $\begin{cases} \text{(Skip steps 424)} \\ \text{HPolarity} = 1, 2 \end{cases}$ 481 $\begin{cases} \text{VEdgeTime.2} = t_5 \\ \text{VEdgeHCnt.2} = 2 \\ \text{FieldCnt} = 0 \end{cases}$ $t_5$ 482 $\begin{cases} \text{HPolarity} = 0 \\ \text{PreviousHalf} = 1 \\ \text{PreviousVert} = 1 \end{cases}$ $t_5 - t_6$ 483 $\begin{cases} \text{(Skip steps 424)} \\ \text{HPolarity} = 1, 2, 3, 4, 5, 6 \end{cases}$ $t_6 - t_7$ 484 $\begin{cases} \text{VPolarity} = 3 \\ \text{HPolTotal} = 3 \\ \text{HSyncCnt} = 3 \\ \text{HPolarity} = 0 \\ \text{PreviousHalf} = 0 \end{cases}$ 485 — HPolarity = -1, 0, 1, 2, 3

$t_7 - t_8$ 486 $\begin{cases} \text{VPolarity} = 4 \\ \text{HPolTotal} = 4 \\ \text{HSyncCnt} = 4 \\ \text{HPolarity} = 0 \\ \text{PreviousHalf} = 1 \end{cases}$ 487 — HPolarity = -1, 0, 1, 2, 3

$t_8 - t_9$ 488 $\begin{cases} \text{VPolarity} = 5, 6...300 \\ \text{HPolTotal} = 5, 6...300 \\ \text{HSyncCnt} = 5, 6...300 \\ \text{HPolarity} = 0 \\ \text{PreviousHalf} = 0 \end{cases}$ 489 — HPolarity = -1, 0, 1, 2, 3, -1, 0, 1, 2, 3...-1, 0, 1, 2, 3

$t_9 - t_{10}$ 490 $\begin{cases} \text{VPolarity} = 301 \\ \text{HPolTotal} = 301 \\ \text{HSyncCnt} = 301 \\ \text{HPolarity} = 0 \\ \text{PreviousHalf} = 1 \end{cases}$ 491 — HPolarity = -1, 0, 1, 2, 3

$t_{10} - t_{11}$ 492 $\begin{cases} \text{VPolarity} = 302 \\ \text{HPolTotal} = 302 \\ \text{HSyncCnt} = 302 \\ \text{HPolarity} = 0 \\ \text{PreviousHalf} = 0 \end{cases}$ 493 — HPolarity = -1, 0, 1, 2, 3

$t_{11} - t_{12}$ 494 $\begin{cases} \text{VPolarity} = 303 \\ \text{HPolTotal} = 303 \\ \text{HSyncCnt} = 303 \\ \text{HPolarity} = 0 \\ \text{PreviousHalf} = 1 \end{cases}$ 495 — HPolarity = -1, 0, 1, 2, 3

496 $\begin{cases} \text{VEdgeTime.3} = t_{12} \\ \text{VEdgeHCnt.3} = 303 \\ \text{FieldCnt} = 0 \end{cases}$

*FIG. 8A*

!! Start here when the system powers up.

```
500  ShownSignal ← NotValid                            !! Start by assuming there's no signal on the screen
502  SetupHardware(NotValid, DefaultTuning)            !! Put hardware in a safe, neutral state.

do forever                                         !! Eternal loop representing normal operation
506    CSignal ← MeasureComputer()                      !! Measure computer signal features
508    BSignal ← MeasureBVideo()                        !! Measure broadcast video features 510    NewSignal ← CSignal                              !! Assume we'll display the computer signal
512    if BVideoPreferred AND NOT (NotValid ≈ BSignal)  !! Is broadcast-type signal preferred and available?
504      then NewSignal ← BSignal                       !! If so, that's the signal we'll use.

if NOT (ShownSignal ≈ NewSignal) then            !! Does input signal resemble what was on screen?
518       ShownSignal ← NewSignal                       !! If not, we need to set up the hardware differently.
520       FoundTuning ← FALSE
          for every SavedSignal in SavedList            !! Look through all records of saved signals
522          if ShownSignal ≈ SavedSignal.Desc then     !! Does current signal match saved record?
                SignalTuning ← SavedSignal.Tune         !! Pick up the saved tuning parameters
524             FoundTuning ← TRUE                      !! Note that we found tuning parameters
                exitloop                                !! Stop scanning SavedList
             endif
          endfor
516
          if NOT FoundTuning then                       !! Use factory defaults of nothing's been saved
             for every SavedSignal in FactoryList       !! Look at factory list of signal tuning parameters
530             if ShownSignal ≈ SavedSignal.Desc then  !! When we find a matching description,
                   SignalTuning ← SavedSignal.Tune      !!     pick up the tuning values.
534             exitloop                                !! Special "default" case in FactoryList matches
                endif                                   !!     all signals and assures loop termination.
             endfor                                     !! Also assures that every signal has some tuning
          endif                                         !!     parameters available.

!! Combine measured signal data (ShownSignal) with saved or factory
          !! tuning values (SignalTuning) to set up the video hardware for this signal.
540       SetupHardware (ShownSignal, SignalTuning)
       endif if UserRequestsMenu then                         !! Handle user interface when user hits button.
          SignalTuning ← UserTuning(SignalTuning)       !! Let user change current signal tuning values
          add [ShownSignal, SignalTuning] to SavedList  !! Add/replace an entry in saved list of signals
550       SetupHardware(ShownSignal, SignalTuning)      !! Recombine measured with new user values
       endif enddo
```

*FIG. 9*

VIDEO SIGNAL INTERFACE SYSTEM UTILIZING DEDUCTIVE CONTROL

FIELD OF THE INVENTION

This invention relates generally to a video signal interface system and, more particularly, to a video signal interface system utilizing a deductive control scheme.

BACKGROUND OF THE INVENTION

Video interface systems for displaying input video signals from different types of video sources are known. While many characteristics of video signals vary in accordance with the particular source, common video signal attributes are Horizontal SYNC, or HSYNC, pulses which define the end of a line and Vertical SYNC, or VSYNC, pulses which define the end of a field.

Generally, video interface systems include a memory table containing a list of known video source names and a set of characteristics associated with each known video source. When a video signal is received, one or perhaps a few characteristics of the video signal are measured and compared to the sets of characteristics stored in memory. If the measured characteristics match a set of characteristics stored in memory, then the input video signal is determined to be provided by the video source associated with the matching set of characteristics. Thereafter, the measured characteristics are discarded and the prestored control parameters for that source are used to process and display the input video signal.

The memory table storing known video source names and associated sets of characteristics is limited both by the number of known video sources and the amount of available memory. If either of these factors results in the omission of a particular video source from the table (i.e., if a video signal is received from an "unknown" source), then the system has no way of processing and displaying the signal.

SUMMARY OF THE INVENTION

A video signal interface system for displaying video signals from various sources includes a processor responsive to an input video signal for measuring characteristics of the video signal and for controlling the display thereof. The input video signal is processed in response to the measured characteristics. The video interface system implements deductive control in the sense that characteristics of an input video signal are measured and are used to deduce how to control certain parameters associated with the processing and display of the video signal. In particular, measured signal characteristics are used to deduce critical control parameters (i.e., those controls affecting correct signal capture and display, as contrasted to non-critical controls which affect display quality). Illustrative measured characteristics include the type of video signal (i.e., whether the signal is a broadcast video signal or a computer video signal) and the protocol of the video source (i.e., number of wires on which the input video signal is carried). The polarity of the HSYNC and VSYNC pulses of the input video signal, the number of HSYNC pulses/field and the duration of the field are also measured. These measured signal characteristics are used to establish appropriate SYNC signal routing through the system, to determine image scaling factors and to initiate signal sampling, among other uses.

With this arrangement, limitations associated with conventional video interface systems are overcome by processing video signals in response to measured characteristics of such signals. That is, the present system does not rely on predetermined characteristics of known video signals but rather, displays video signals in response to measured signal characteristics. Thus, dependence on the completeness and/or accuracy of memory entries associated with known video sources is eliminated.

User adjustable tuning settings are used to set non-critical control parameters and are utilized in combination with the measured signal characteristics to process input video signals and display the processed signals on a video display unit, such as a flat panel display. To this end, a first memory table stores names and associated characteristics of known video sources and a second memory table stores measured characteristics of processed video signals unknown to the system before processing. Tuning settings are also stored in the first and second memory tables, in association with each entry. Initially, the stored tuning settings are set to default values. Subsequently, a user is able to vary the tuning settings, such as brightness, contrast and centering, causing the corresponding memory entry to be updated.

Once characteristics of an incoming video signal are measured, such measured characteristics are compared to entries in the second memory table corresponding to previously processed video signals. In the event that the measured characteristics are determined to match characteristics associated with a previously processed signal, then the tuning settings stored in association with such previously processed signal are used in conjunction with the measured characteristics to process the signal. If no match is found between the measured characteristics and characteristics stored in the second memory table, then the measured characteristics are compared to the characteristics associated with known video sources stored in the first memory table. If the measured characteristics are determined to match characteristics associated with a known video source, then the tuning settings stored in association with such known video source are used in conjunction with the measured characteristics to process the incoming video signal. Alternatively, if the measured characteristics do not match characteristics associated with a previously processed video source or a known video source, then the measured characteristics are stored in the second memory table, along with default tuning settings, in order to identify a new video source.

With this arrangement, default or user adjusted tuning settings are stored in memory in association with entries corresponding to known and new video sources. Maintaining entries in the memory tables for all processed video sources permits tuning adjustments associated with such sources to be stored and modified for use in video signal processing and display.

BRIEF DESCRIPTION OF THE DRAWINGS

The foregoing features of this invention, as well as the invention itself, may be more fully understood from the following detailed description of the drawings in which:

FIGS. 5 and 5A contain pseudocode illustrating how certain characteristics of a composite input video signal are measured;

FIG. 6A illustrates the operation of the pseudocode of FIGS. 5 and 5A in processing the signals of FIG. 6;

FIGS. 7 and 7A contain pseudocode illustrating how certain characteristics of a separate SYNC input video signal are measured;

FIG. 8A illustrates the operation of the pseudocode of FIGS. 7 and 7A in processing the signals of FIG. 8; and FIG. 9 contains pseudocode illustrating the process flow of deductive control in accordance with the invention.

DESCRIPTION OF THE PREFERRED EMBODIMENT

Figure 1:
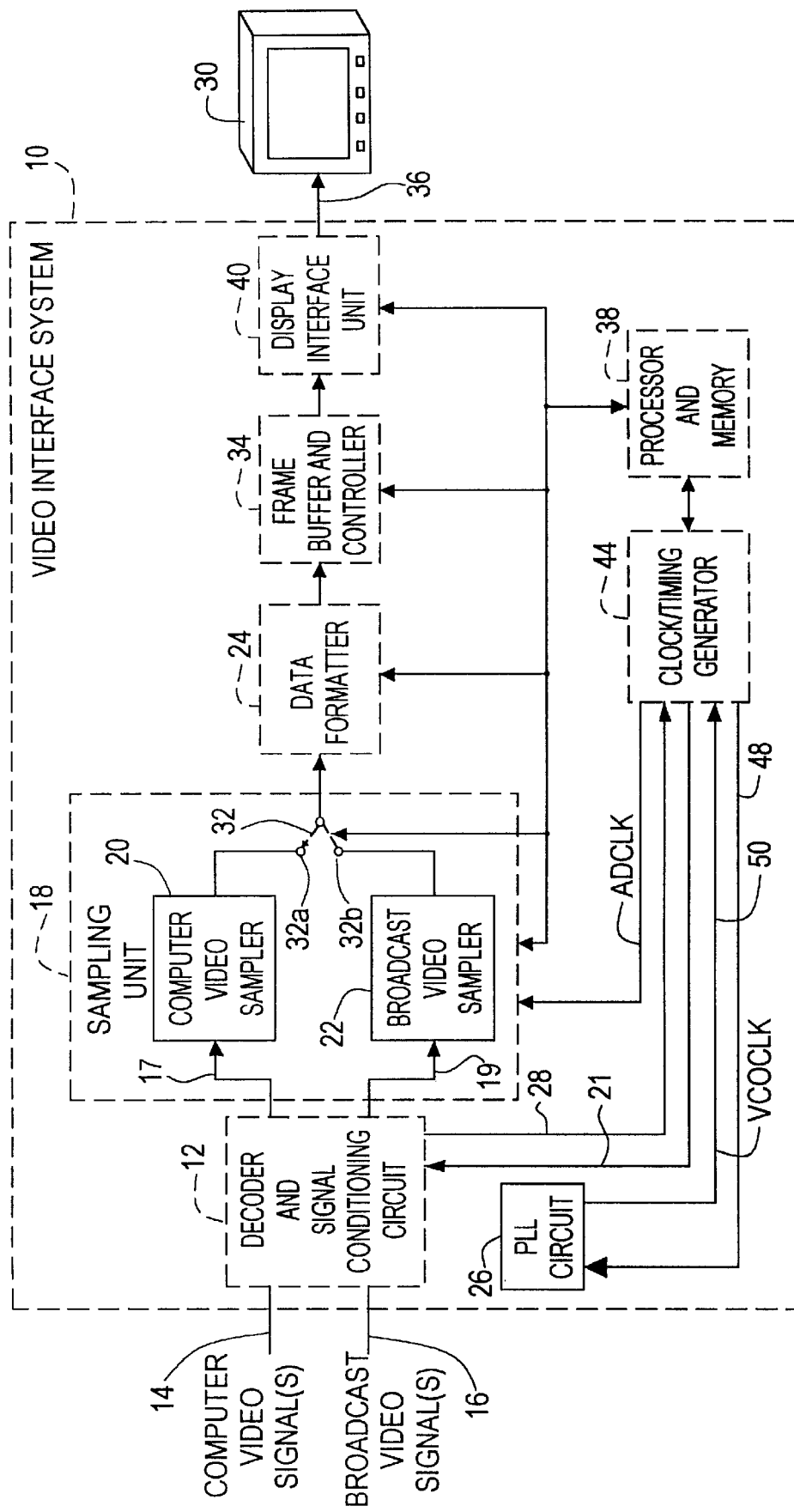
FIG. 1 is a block diagram of a video interface system in accordance with the invention.

Referring to FIG. 1, a video interface system 10 is shown for converting an input video signal 14, 16 of a first format compatible with a first type of display into an output video signal 36 of a second format compatible with a second type of display, such as a flat panel display 30. Illustrative types of flat panel displays include Liquid Crystal Displays (LCDs), electroluminescent displays, and plasma displays. The interface system 10 is responsive to computer video signals 14 generated by a computer video source (not shown) and to broadcast video signals 16 generated by a broadcast video source, for example of the NTSC, SECAM or PAL format. At any given time, the system 10 may receive computer video signals 14 or broadcast video signals 16, or both, as will be described below. Although the input video signals 14, 16 are carried on between one and five individual signal lines depending on the protocol of the video source, the input signals 14, 16 are referred to hereinafter in the singular for simplicity.

The video interface system 10 includes a decoder and signal conditioning circuit 12 for optionally decoding and/or conditioning the input video signal 14, 16, as will be described further in conjunction with FIG. 2. In processing video signals in which the SYNC information (i.e., HSYNC and VSYNC pulses) are encoded with one or more of the color signals, the decoder 12 serves to separate the SYNC signals from the color signals. The SYNC signals are coupled to a clock/timing generator 44 via a bus 28. Also, in processing a video signal 16 from a broadcast video source, SECAM, PAL or NTSC decoders may be used to extract color information. However, in some cases, decoding the input video signal 14, 16 is not necessary. For example, where the input video signal 14, 16 is a five wire signal, the red, green and blue color signals, as well as the HSYNC and VSYNC signals, are provided on separate signal lines. The color signals may be conditioned by variable gain amplifiers within the circuit 12.

A PLL circuit 26 is responsive to several signals 48 from a clock/timing generator 44 for generating a VCOCLK signal 50. The VCOCLK signal 50 is phase-locked to the input video signal 14, 16 and has a frequency which is equal to, or a multiple of, the pixel frequency of the input signal. In the present embodiment, the PLL circuit 26 is operable to track frequencies between approximately 67.5 MHz and 135 MHz. If the pixel frequency of the input video signal 14, 16 is within this range, then the frequency of the VCOCLK signal 50 is equal to the frequency of the input video signal; whereas, if the frequency of the input video signal is less than 67.5 MHz, then the frequency of the VCOCLK signal 50 is a multiple of the frequency of the input video signal.

Output signals 17, 19 of the decoder and signal conditioning circuit 12 contain the color information about each pixel of the input video signal and are coupled to a sampling unit 18 containing samplers 20 and 22. In the illustrative embodiment, the sampling unit 18 contains samplers, or digitizers 20 and 22, such as analog to digital converters. The samplers convert the analog color signals into digital signals and include a computer video sampler 20 responsive to computer video color signals 17 and a broadcast video sampler 22 responsive to broadcast video color signals 19. It will be appreciated however that the sampling unit 18 may alternatively sample already digitized signals 17, 19.

The outputs of samplers 20 and 22 are coupled to a switch 32 which is controlled by a processor and memory unit 38. In some situations, both a computer video signal 14 and a broadcast video signal 16 are simultaneously coupled to the system 10. In this case, a user is permitted to pre-program a selection of one type of signal for processing and display and the switch 32 is positioned in accordance with the user's preference of computer video signal or broadcast video signal as stored in memory 38.

Computer video signals 14 have been previously quantized at the video source and thus, can be considered to have a characteristic frequency associated therewith corresponding to the frequency of the original quantized signal (i.e., the pixel frequency). Each period of the input video signal 14, 16 corresponds to one element, or pixel, within a line of a frame represented thereby. Illustrative characteristic frequencies associated with computer video signals 14 are between approximately 32.5 MHz to 135 MHz. Broadcast video signals 16 on the other hand generally have characteristic frequencies on the order of approximately 15 MHz.

The digitizers 20, 22 operate to sample the respective video signal 17, 19 at a rate set by an ADCLK signal generated by the clock/timing generator 44. The ADCLK signal has a frequency equal to one-half the frequency of the VCOCLK signal 50. The output of switch 32 provides a digitized signal 42 which corresponds to samples of pixels of the input video signal 14, 16. In one embodiment, the digitized signal 42 is a twenty-one bit signal, with seven bits providing red pixel data, seven bits providing blue pixel data and seven bits providing green pixel data. Depending on the pixel frequency of the input video signal 14, 16, the digitizers 18 may sample the incoming video signal at a frequency less than the pixel frequency in accordance with a "pixel interleaving" mode of operation described in a co-pending U.S. patent application Ser. No. 08/538,116, filed on Oct. 2, 1995, entitled "VIDEO INTERFACE SYSTEM UTILIZING REDUCED FREQUENCY VIDEO SIGNAL PROCESSING", assigned to the assignee of the present invention and incorporated herein by reference.

The digitized signal 42 is coupled to a data formatter 24 which, in some applications, further samples the digitized signal 42. More particularly, since, in the illustrative embodiment, the PLL circuit 26 can track frequencies only down to 67.5 MHz, in situations in which the pixel frequency of the input video signal is relatively low, the ADCLK signal will have a frequency greater than the pixel frequency. In these cases, there is no need to sample the input video signal 14, 16 during every cycle of the ADCLK signal, as is achieved by the digitizers 18. Rather, the digitized signal 42 is sampled at some sub-multiple of the ADCLK signal by the data formatter 24.

Also provided in the data formatter 24 is a dithering circuit which optionally implements an interpolation process on the bits of each pixel of the digitized signal 42. The dithering circuit spatially approximates each seven bit color signal of the digitized signal 42 to provide a five bit color signal. Thus, the output of the dithering circuit is a fifteen bit signal, with five bits representing each color component of the pixel.

In some applications, the digitized video signal 42 must be scaled (i.e., its resolution converted) so that an incoming frame can fit on the screen of the flat panel display 30. That is, the resolution of the input video signal 14, 16 may be different from the resolution associated with the flat panel display 30. In the illustrative embodiment, the resolution of the flat panel display 30 is 1024×768 pixels. Illustrative computer video source resolutions are 800×600, 640×480, 1024×768, 1280×1024, and 1152×900. Thus, in the latter two cases, each incoming video frame may be reduced in both number of lines and number of pixels/line. The line and pixel/line scaling of the incoming video signal is performed by the data formatter 24.

In accordance with one embodiment, where the input video signal has a resolution of 1280×1024, one out of every four lines and one out of every four pixels/line are discarded, to provide an effective input resolution of 960×768 which is compatible with the 1024×768 resolution of the flat panel display 30. Similarly, in one embodiment where the input video signal resolution is 1152×900, one out of every six lines and one out of every six pixels/line are discarded, to provide an effective input resolution of 960×750 which is compatible with the 1024×768 resolution of the flat panel display 30. It will be appreciated by those of skill in the art however that various techniques may be used to scale the resolution of the input video signal in order to render the resolution of the incoming signal compatible with the resolution of the display. For example, lines may be "dropped" by combining pixels from more than one line into a single composite line. Since most conventional broadcast video sources transmit frames containing 475 or 575 lines typically sampled near 640 or 760 pixels/line so as to maintain a 4:3 image aspect ratio, neither scaling down of the number of lines of a frame nor the number of pixels/line is generally necessary for a flat panel display with a 1024×768 resolution.

The data formatter 24 forwards the data thus processed to a frame buffer and controller 34 which temporarily stores the pixels of the digitized signal 42. Pixels are read out of the frame buffer and controller 34 under the control of a display interface unit 40 and the controller portion of the frame buffer and controller 34. The clock/timing generator 44 generates several clock signals and other signals for use throughout the system 10.

The processor and memory 38 controls various aspects of the video interface system 10, including the display interface unit 40, the data formatter 24, the frame buffer and controller 34 and the clock/timing generator 44, as will be described in conjunction with FIG. 3. Additionally, the processor and controller 38 performs deductive control, whereby characteristics of an incoming video signal 14, 16 are measured and deductions made to control various parameters associated with the video signal processing and display. The deductive control of the present invention is implemented in both software executed by the processor and in hardware portions of the system, as described below. In the illustrative embodiment, the processor is a Texas Instrument TMS320C52 microprocessor executing code stored in a non-volatile memory portion of the processor and memory 38. It will be appreciated however that the particular software and/or hardware implementation of the apparatus and techniques described herein may be varied.

Figure 2:
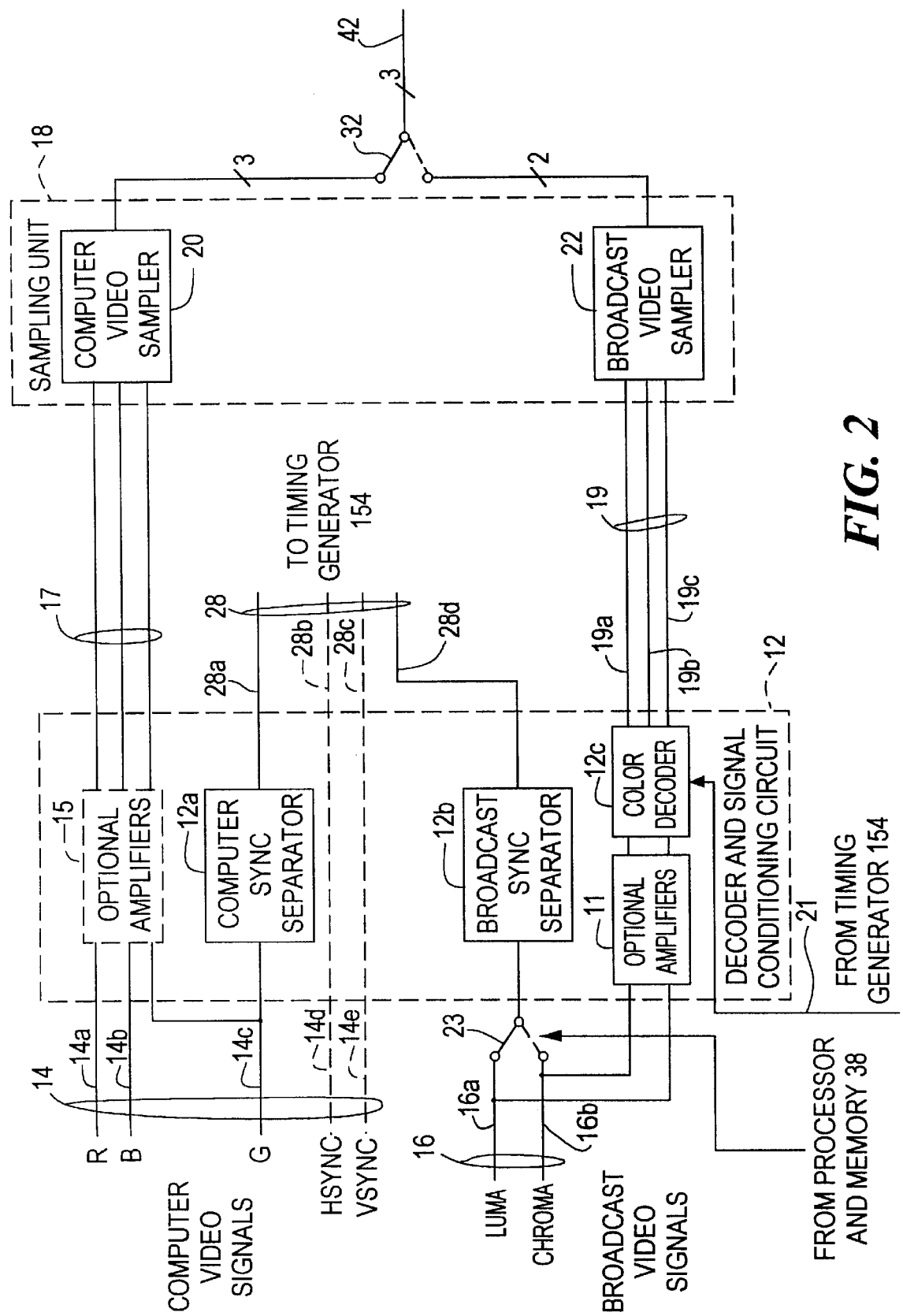
FIG. 2 is a block diagram of the front end of the video interface system of FIG. 1.

Referring also to FIG. 2, a block diagram of the decoder and signal conditioning circuit 12 and the sampling unit 18 is shown. A computer video signal 14 is carried on between one and five individual signal lines 14a, 14b, 14c, 14d and 14e. Signal lines 14d and 14e are formed by dashed lines to indicate that such signal lines may or may not carry signals, depending on the video source protocol. More particularly, in accordance with a three wire protocol, only signal lines 14a, 14b and 14c are used, with the HSYNC and VSYNC information encoded on the green signal line 14c. In a four wire protocol, the HSYNC and VSYNC signals are provided by a composite SYNC signal on line 14d. Finally, if the video source is of the five wire type, then all five signal lines 14a–14e carry respective red, blue, green, HSYNC and VSYNC signals. Thus, the only signal line that can include both color information and SYNC information is signal line 14c, in the case of the three wire protocol.

It is noted that the presence of separate VSYNC information on signal line 14e does not preclude composite encoding of VSYNC information on the HSYNC signal line 14d. Likewise, the presence of valid SYNC information on the HSYNC signal line 14d does not preclude the presence of composite SYNC information on the green signal line 14c. When such redundant SYNC information is present in the illustrative embodiment, the computer video source is determined to be of the five wire protocol even if three wire or four wire SYNC information is available and the computer video source is determined to be of the four wire protocol even if three wire SYNC information is also available.

Signal line 14c is coupled to a computer SYNC separator 12a within the decoder and signal conditioning circuit 12 for separation of the green color information from the encoded SYNC information. The output of the computer SYNC separator 12a is coupled to a timing generator 154 (FIG. 3) of the clock/timing generator 44 via signal line 28a. The separate SYNC signal lines 14d and 14e are coupled directly to the timing generator 154 via signal lines 28b and 28c, as shown. The red, blue and green signal lines 14a, 14b and 14c, respectively, may be optionally amplified by amplifiers 15 for coupling to the computer video sampler 20 within the sampling unit 18, as shown.

Broadcast video sources provide information on one or two signal lines, labelled luma 16a and chroma 16b. In accordance with an S-Video protocol, chroma information is carried on the chroma line 16b and SYNC information is encoded with the luma information on the luma signal line 16a. In accordance with a composite broadcast protocol, the luma, chroma and the SYNC information are encoded on the chroma signal line 16b and the luma signal line 16a is unused.

A switch 23 is coupled between the broadcast signal lines 16a and 16b and a broadcast SYNC separator 12b within the decoder and signal conditioning circuit 12. The switch 23 is controlled by the processor and memory 38 for selectively coupling one of the signal lines 16a and 16b to the broadcast SYNC separator 12b for separation of SYNC information. The composite broadcast SYNC signal (i.e., including both VSYNC and HSYNC information) is coupled to the timing generator 154 via signal line 28d.

The broadcast video signals 16a and 16b are further coupled to optional amplifiers 11 and to a color decoder 12c within the decoder and signal conditioning circuit 12, as shown. The color decoder 12c breaks down the composite broadcast video signal into individual red, blue and green signals carried on respective signal lines 19a, 19b and 19c for further processing by the broadcast video sampler 22. As discussed above, the sampling unit 18 converts the analog color signals 17, 19 into digital signals for selective coupling to the data formatter 24 (FIG. 1) via switch 32.

Figure 3:
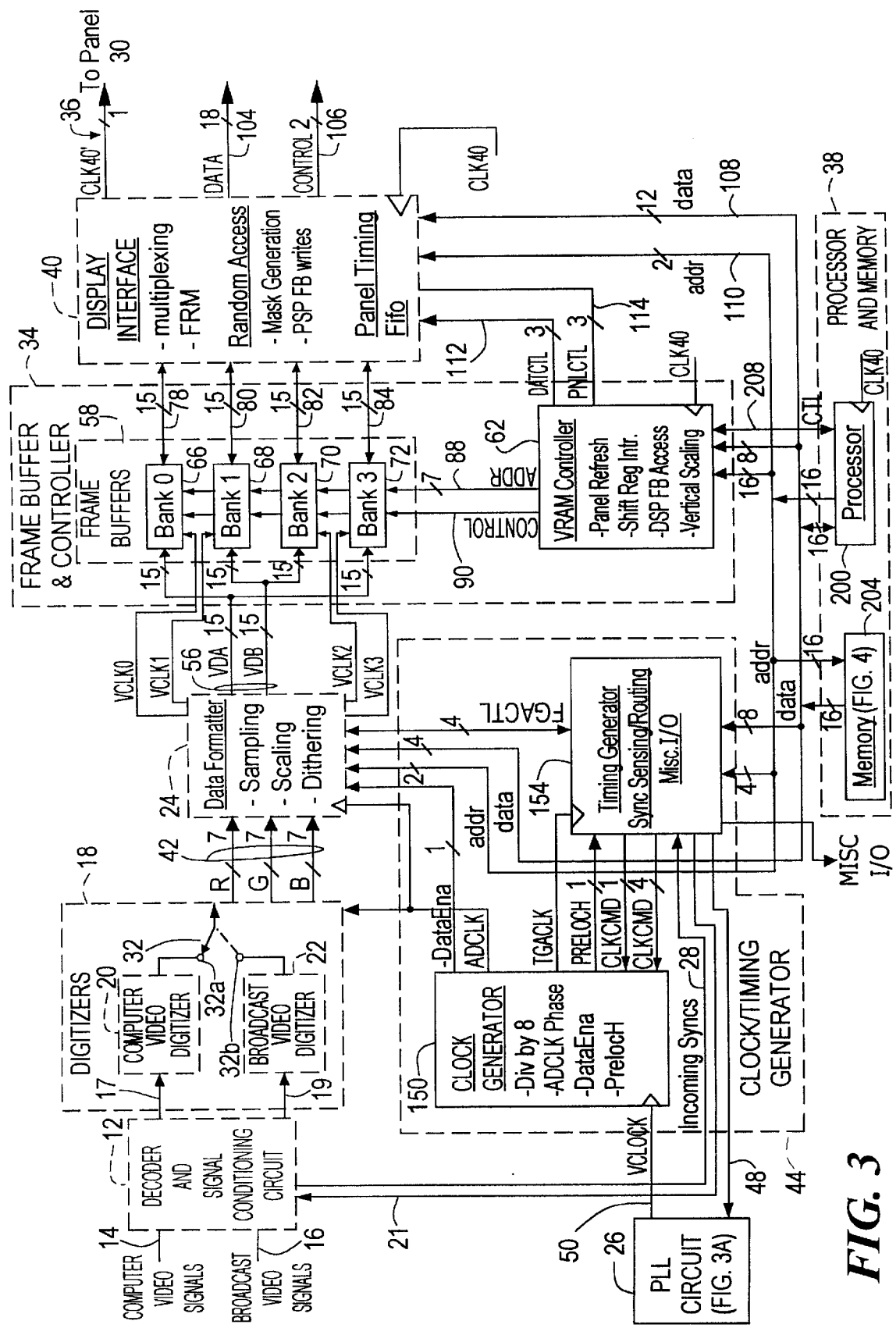
FIG. 3 is a detailed block diagram of the video interface system of FIG. 1.

Referring to FIG. 3, the video interface system 10 is shown in greater detail. The digitizers 18 provide a twenty-one bit output signal 42, consisting of seven bits of red data, seven bits of green data and seven bits of blue data, to the data formatter 24. As noted above, the data formatter 24 implements resolution scaling and dithering features. Additionally, the data formatter 24 may further sample the digitized signal 42 in applications in which the ADCLK signal has a frequency greater than the pixel frequency of the input video signal 14, 16.

In the illustrative embodiment, the output bus 56 of the data formatter 24 is wider than the input bus 42 in order to avoid exceeding the bandwidth of frame buffers 58 within the frame buffer and controller 34. More particularly, in applications in which pixel frequency of the input computer video signal 14 is on the order of 135 MHz, the computer video digitizer 20 will sample at approximately 67.5 MHz. Since the illustrative frame buffers 58 cannot accept serial data that fast, a mismatch occurs. To overcome this mismatch, the output data bus 56 of the data formatter 24 is made wider than the input data bus 42. To this end, the output data bus 56 includes two fifteen bit buses VDA and VDB, as shown. Since the dithering circuit within the data formatter 24 approximates the seven bit pixel color signals with corresponding five bit signals, the output data bus 56 is twice as wide as the fifteen bit data bus at the output of the dithering circuit. The data formatter 24 additionally provides clock signals VCLK0, VCLK1, VCLK2 and VCLK3 to the frame buffer and controller 34 for controlling the rate at which data from the bus 56 is clocked into the frame buffers 58.

The frame buffer and controller 34 includes frame buffers 58, comprising a plurality of VRAM devices, and a VRAM controller 62. In the illustrative embodiment, the frame buffers 58 include eight VRAM devices, with each pair of VRAMs comprising a memory bank, labelled Bank0 66, Bank1 68, Bank2 70 and Bank3 72. Bank0 66 and Bank3 72 each receive data from the VDA bus and Bank1 68 and Bank2 70 each receive data from the VDB bus. In the illustrative embodiment, each of the memory banks 66–72 has 256K addressable locations, with each addressable location spanning the two VRAMs of the respective pair to accommodate the depth of the stored pixels. While three such banks would provide the requisite total storage space to store the 1024×768 pixels associated with a frame displayed on the flat panel display 30, other factors dictate the choice of four banks, such as read out bandwidth. It will be appreciated however, that the particular number, as well as the structural and logical arrangement of the VRAMs comprising the memory banks 66–72, may be readily modified for a given application as is necessary to accommodate varying capacities of stored pixels and other design considerations.

Each of the memory banks Bank0 66, Bank1 68, Bank2 70 and Bank3 72 receives a clock signal VCLK0, VCLK1, VCLK2 and VCLK3, respectively, from the data formatter 24 and provides a fifteen bit output signal 78, 80, 82 and 84, respectively, to the display interface unit 40. In one embodiment, each of the VRAM devices is an NEC 482235 device.

The VRAM controller 62 controls the memory banks 66–72 via an address bus 88 and a control bus 90. More particularly, the VRAM controller 62 is responsive to a three bit PNLCTL signal 114 from the display interface unit 40 for causing the flat panel display 30 to be refreshed. In one embodiment, the PNLCTL signal 114 instructs the controller 62 whether or not to start fetching pixels from the frame buffers 58 for forwarding to a FIFO within the display interface unit 40 and whether or not to reset a user interface control panel feature on the display 30. In response to a command to start fetching pixels, the VRAM controller 62 controls the fetching process by sending the addresses of the pixels to be fetched to the frame buffers 58 via the address bus 88 and by sending a read out command to the frame buffers 58 via control bus 90. The VRAM controller 62 also transmits a three bit DATCTL signal 112 to the display interface unit 40 to instruct the interface unit when to read data out of the frame buffers 58.

The VRAM controller 62 also controls a shift register interrupt feature. In the illustrative embodiment, each of the VRAMs comprising the frame buffers 58 includes a shift register from which a 512 bit serial stream is simultaneously transferred into the dynamic memory portion of the device. This transferring, or shifting function is performed at predetermined time intervals. When the shift registers are full, the clock/timing generator 44 generates control signals via a three bit SRTCTL signal to command the VRAM controller 62 to interrupt any writing to, or reading from, the frame buffers 58 in order to permit the contents of the VRAM shift registers to be shifted into the dynamic portion of the VRAMs. Thus, a panel refresh operation may be temporarily interrupted in order to transfer the contents of the VRAM shift registers into dynamic memory. A nine bit SRTDAT signal is also provided by the timing/clock generator 44 to the VRAM controller 62 and contains the address for the row of the dynamic portion of the VRAM into which the shift register contents are to be transferred.

In the illustrative embodiment, the processor 200 of the processor and memory unit 38 writes the user interface control panel into the frame buffers 58 in accordance with information stored in memory 204. The VRAM controller 62 controls the processor's access into the frame buffers 58 by sending the appropriate address and control information to the frame buffers via buses 88 and 90. The actual data to be written by the processor 200 to the frame buffers 58 is routed through the display interface unit 40 via data bus 108 and address bus 110. To this end, the VRAM controller 62 transmits the DATCTL signal to the display interface unit 40 to instruct the interface unit 40 when to write the data to the frame buffers 58.

Scaling the resolution of the incoming video signal 14, 16 by expanding the number of lines in the frame (i.e., vertical expansion) is performed by the VRAM controller 62. More particularly, in some applications in which an incoming video frame has fewer lines than the 768 lines associated with the flat panel display 30, the VRAM controller 62 performs a process of expanding the number of input lines to fill up an entire screen of the flat panel display 30. In one embodiment, vertical expansion is achieved by repeating each line of the input video signal a predetermined number of times to provide the output video signal 36. However, it will be appreciated that various techniques may be used to achieve vertical expansion scaling.

The display interface unit 40 optionally performs frame rate modulation (FRM) on the pixels stored in the memory banks 66–72, which causes the five bit pixel color signals to be further approximated by three bit signals. FRM differs from the dithering process used by the data formatter 24 to convert the seven bit pixel color signals into five bit pixel color signals in that FRM approximates the signal over time, whereas dithering implements a spatial approximation technique. The display interface unit 40 includes a FIFO for temporarily storing the frame rate modulated pixels. A multiplexer multiplexes the pixels stored in the FIFO to provide the pixels for subsequent transfer to the flat panel display.

The display interface unit 40 additionally serves to provide random access to the memory banks 66–72 for purposes of writing data from the processor 200 to the frame buffers 58, as discussed above, and also to implement mask generation. Mask generation is a process whereby certain ones of the VRAMs are not loaded with the data in the respective serial shift register in accordance with masks set to control pixel storage.

The display interface unit 40 controls the timing of display refreshes. To this end, the interface unit 40 includes free-running clock circuitry responsive to a CLK40 signal generated by a crystal coupled to the processor 200 and, in the illustrative embodiment, having a frequency of 40 ns. The interface unit 40 provides a CLK40' signal to the display 30. The panel timing circuitry within the interface unit 40 additionally creates HSYNC and VSYNC signals for the display and forwards such control information to the display via a control bus 106. As noted above, the interface unit 40 contains a FIFO which stores pixels which are read out of the frame buffers 58. In one embodiment, the FIFO can store sixty-four pixels. The pixels from the FIFO are transferred to the flat panel display 30 via a data bus 104. The output video signal 36 includes the CLK40' signal, the control bus 106 and data bus 104.

The clock/timing generator 44 is responsive to the VCOCLK signal 50 and to the SYNC signals 28 for generating a plurality of clock and other timing signals for use various components of the video interface system 10. The clock/timing generator 44 includes a clock generator 150 and the timing generator 154. The clock generator 150 is responsive to the VCOCLK signal 50 for generating the ADCLK signal, a TGACLK signal, and a PRELOCH signal. The timing generator 154 is clocked by the TGACLK signal and generates CLKMOD and CLKCMD signals for use by the clock generator 150. The timing generator 154 additionally conditions the PRELOCH signal to provide a LOCHSYNC signal 235 (FIG. 3A) on bus 48 for coupling to the PLL circuit 26. The LOCHSYNC signal 235 is used by the PLL circuit 26 to track the HSYNC pulses of the incoming video signal in order to generate the VCOCLK signal 50.

The processor and memory unit 38 includes the processor 200 and memory 204, both of which are in electrical communication with the data bus 108 and address bus 110, as shown. Additionally, the processor 200 sends and receives control signals 208 to and from the VRAM controller 62 informing the controller that access to the frame buffers 58 is desired. In the illustrative embodiment, the data formatter 24, the clock/timing generator 44, the VRAM controller 62 and the display interface unit 40 are implemented on four individual field programmable gate arrays (FPGAs), with the code for each of the FPGAs being stored in flash memory 204.

Figure 3A:
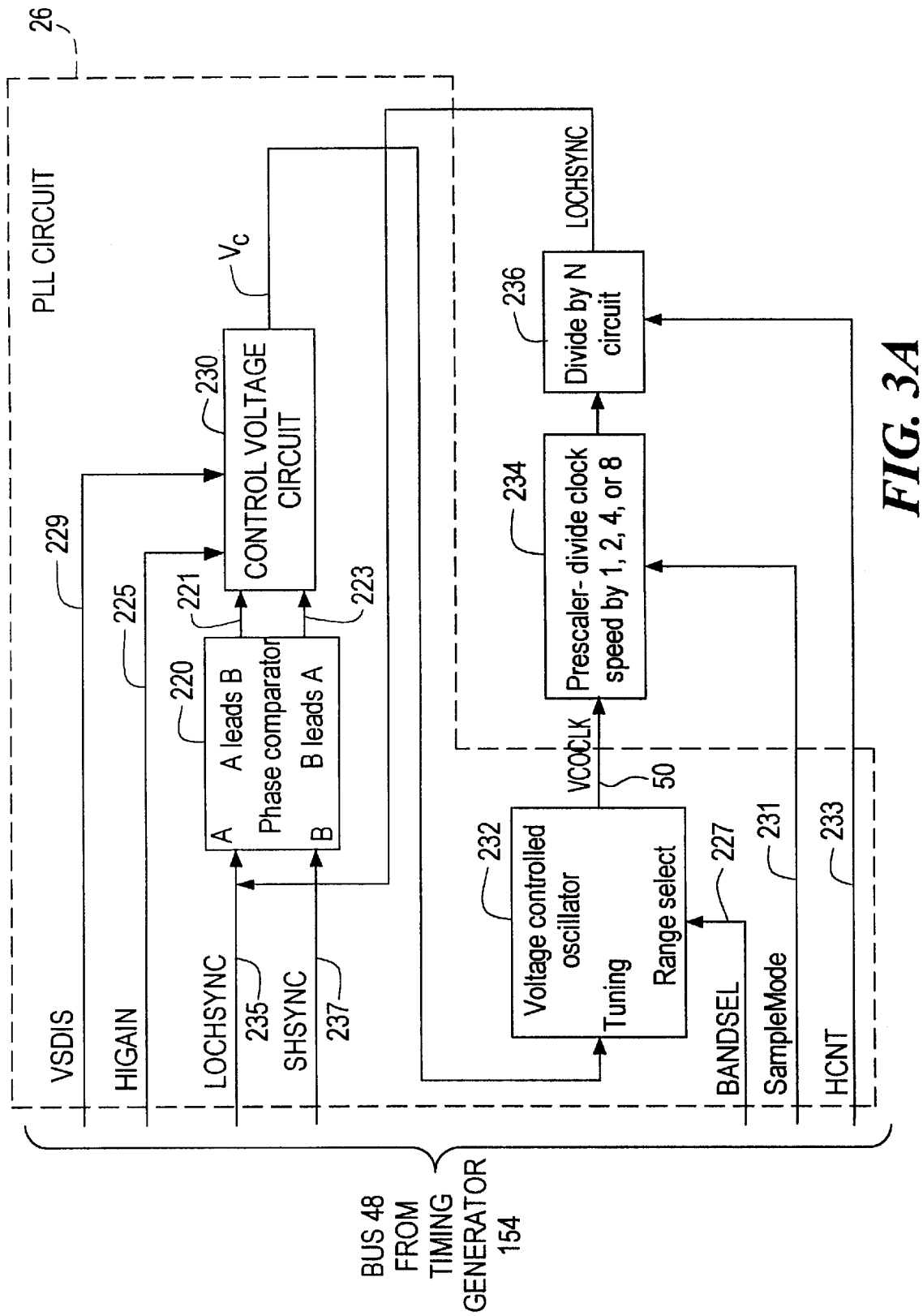
FIG. 3A is a block diagram of the Phase Locked Loop (PLL) circuit of FIG. 3.

Referring also to FIG. 3A, the PLL circuit 26 is shown to receive signals over bus 48 from the timing generator 154, including a VSDIS signal 229, a HIGAIN signal 225, the LOCHSYNC signal 235, an SHSYNC signal 237, a BANDSEL signal 227, a SampleMode signal 231 and an HCNT signal 233. A phase comparator 220 is responsive to the LOCHSYNC signal 235 and the SHSYNC signal 237. The output of the phase comparator 220 is coupled to a control voltage circuit 230, as shown. The output signal of the control voltage circuit 230 is an analog control voltage $V_c$ which is coupled to a voltage controlled oscillator (VCO) 232, the output of which provides the VCOCLK signal 50 to the clock generator 150 (FIG. 3). In particular, the VCOCLK signal 50 is coupled to a prescaler circuit 234 which is further coupled to a divider circuit 236, both of which are in the clock generator 150 (FIG. 3). The prescaler circuit 234 divides the VCOCLK signal 50 by predetermined factors, such as 1, 2, 4 or 8. The divider circuit 236 provides the LOCHSYNC signal 235 at its output, as shown.

The SHSYNC signal 237 is the HSYNC signal of an incoming video signal carried on one of signal lines 28a, 28b or 28d (FIG. 2). The phase comparator 220 compares the SHSYNC signal 237 to the LOCHSYNC signal 235 to provide an indication of whether the LOCHSYNC signal leads or lags the SHSYNC signal. During the time when the LOCHSYNC signal has occurred but the SHSYNC signal has not yet occurred, the A leads B output 221 of the phase comparator 220 is active; whereas, during the time that the SHSYNC signal has occurred but the LOCHSYNC signal has not yet occurred, the B leads A output 223 of the phase comparator 220 is active.

The control voltage circuit 230 is responsive to the phase comparator outputs 221 and 223, as well as to the HIGAIN signal 225 and the VSDIS signal 229. In particular, the control voltage circuit 230 integrates the output signals 221 and 223 of the phase comparator 220 to provide an analog control voltage $V_c$ to the VCO 232 which minimizes the amount of time that either the "A leads B" output 221 or the "B leads A" output 223 of the phase comparator 220 is asserted. The HIGAIN signal 225 is a logic signal which sets the gain of the PLL circuit (i.e., the ratio between the time that either the "A leads B" or "B leads A" output of the phase comparator 220 is asserted to a change in the control voltage $V_c$).

The VSDIS signal is provided by the processor 200 via the timing generator 154 and serves as an enable/disable signal to the PLL locking operation. As will be described below, in the event that the incoming video signal contains serration pulses (i.e., HSYNC pulses within active VSYNC pulses), the PLL circuit 26 continuously locks onto the incoming video signal in response to the VSDIS signal. However, since the PLL circuit 26 is susceptible to drift in the event that serration pulses are not present, in the absence of serration pulses, the processor 200 causes the PLL circuit 26 to interrupt locking during VSYNC by toggling the VSDIS signal.

The VCO 232 is also responsive to the control voltage $V_c$ and to the BANDSEL signal 227 which is provided by the processor 200 via the timing generator 154. The BANDSEL signal 227 is a logic signal which determines whether the PLL circuit 26 is operating in a high or low frequency range of a given octave. More particularly, the PLL circuit 26 operates over two frequency bands of a given octave (hereinafter referred to as a high frequency band and a low frequency band) to lock onto the HSYNC pulses of an incoming video signal. The BANDSEL signal 227 selects between an upper portion and a lower portion of a particular octave of operation of the VCO 232. The VCO 232 provides the VCOCLK signal 50 to the prescaler circuit 234 of the timing generator 54, as shown.

The prescaler circuit 234 divides the VCOCLK signal 50 by a factor of one, two, four or eight in response to the SampleMode signal 231 provided by the processor 200 via the timing generator 154. The selection of the factor by which to divide the VCOCLK signal is dependent on which of four corresponding octaves contains the pixel frequency of the incoming video signal. Thus, the output signal of the prescaler circuit 234 has a frequency matched to the pixel frequency of the incoming video signal.

The output of the prescaler circuit 234 is further divided by the divider circuit 236 in order to provide the LOCHSYNC signal for coupling back to the PLL circuit 26, as shown. The divider circuit 236 divides the frequency of the prescaler output signal by a factor N controlled by the HCNT signal 233, which is indicative of the number of pixels/line or, more specifically, the number of pixel times/line. Pixels times/line differs from pixels/line in that the former includes, in addition to the image data, the blanking interval. With this arrangement, the LOCHSYNC signal 235 is provided with a frequency approximately equal to the line frequency of the incoming video signal for comparison to the SHSYNC signal.

Figure 4:
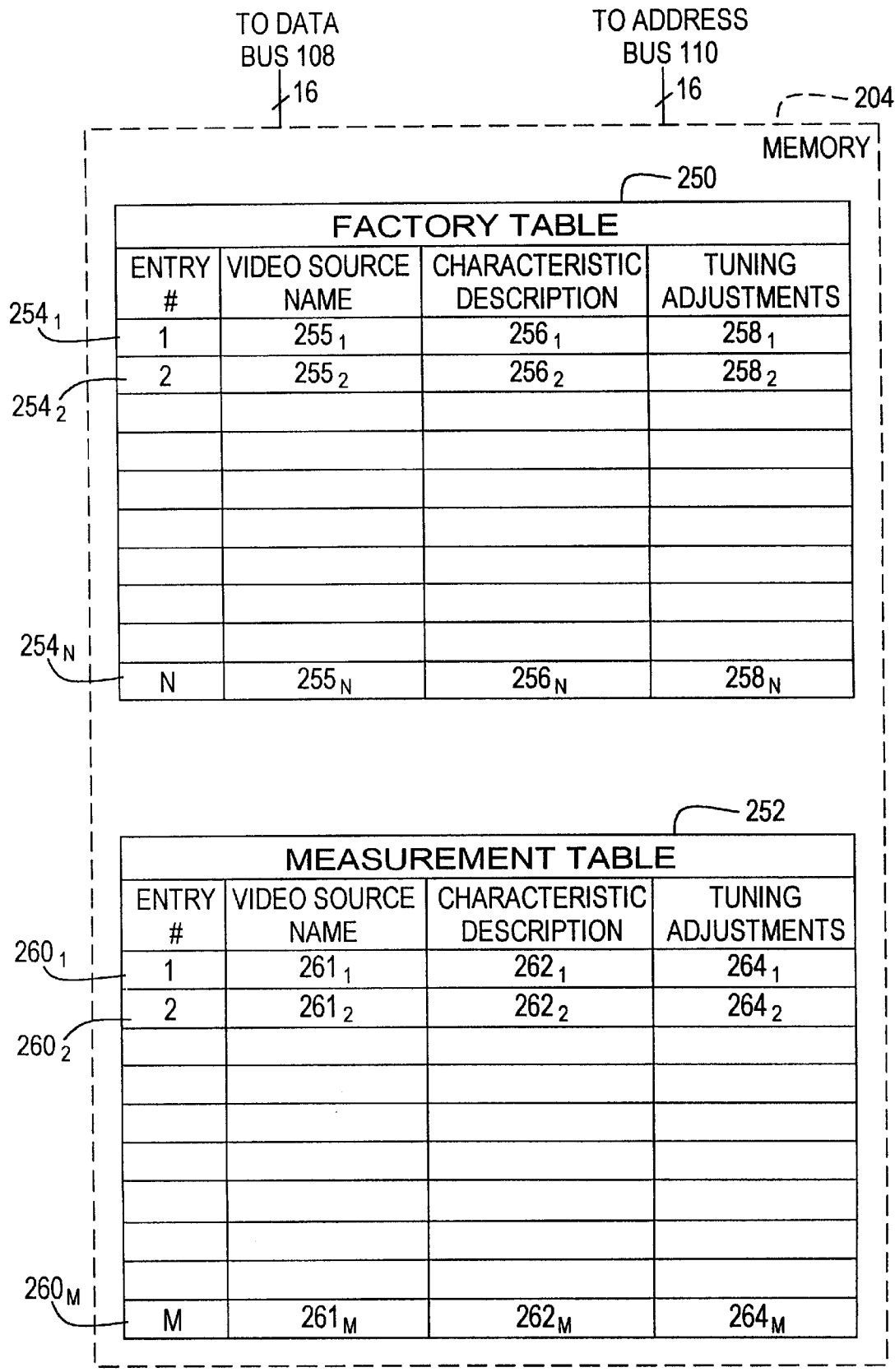
FIG. 4 is a block diagram of tables within the memory of FIG. 3.

Referring also to FIG. 4, a portion of the memory 204 (FIG. 3) is shown to include two tables 250 and 252. Table 250 is referred to as a factory table and includes a plurality of entries $254_1$–$254_N$, each having a video source name field $255_1$–$255_N$, a characteristic description field $256_1$–$256_N$ and a tuning adjustment field $258_1$–$258_N$. The entries $254_1$–$254_N$ of the factory table 250 are predetermined, factory installed entries and correspond to known video sources. The video source name field $255_1$–$255_N$ of each of the entries $254_1$–$254_N$ contains a name of the video source corresponding to that entry. The characteristic description field $256_1$–$256_N$ includes a set of predetermined characteristic values associated with the particular known video source. The tuning adjustment field $258_1$–$258_N$ contains a set of tuning adjustment values, or settings associated with each of the entries $254_1$–$254_N$, such as brightness, contrast and centering values. The tuning adjustment values are initially default values, but may be adjusted in operation by a user.

The measurement table 252 also includes a plurality of entries $260_1$–$260_M$, each one containing a video source name field $261_1$–$261_M$, a characteristic description field $262_1$–$262_M$ and a tuning adjustment field $264_1$–$264_M$. The entries $260_1$–$260_M$ of the measurement table 252 correspond to incoming video signals for which there is no match in the factory table (i.e., to previously "unknown" video sources). It will be appreciated that a "match" between measured signal characteristics and a table entry need not be a one for one match of each such characteristic, but rather may be determined by a measured characteristic falling within a range of values around the stored characteristic to which it is compared for example. The video source name fields $261_1$–$261_M$ of the measurement table 252 contain a video source name derived from measured signal characteristics contained in the corresponding characteristic description field $262_1$–$262_M$, as will be described.

The characteristic description fields $262_1$–$262_M$, contain a set of measured characteristic values associated with a received video signal. In particular, the characteristics contained in a characteristic description fields $262_1$–$262_M$ are listed in Table I below:

TABLE I

1. Number of HSYNC pulses/field
2. Tolerance range for number of HSYNC pulses/field
3. HSYNC pulse duration
4. Tolerance range for HSYNC pulse duration
5. Field duration
6. Tolerance range for field duration
7. * Are serration pulses present?
8. * Are the VSYNC and HSYNC signals separate? (i.e., 5 wire protocol)
9. * Is a digital composite SYNC present? (i.e., a 4 wire computer video signal)
10. * Is a composite SYNC present? (i.e., a broadcast video signal or a 3 wire computer video signal)
11. * Is the signal an interlaced signal?
12. * Is the signal a broadcast or computer signal?
13. * Is HSYNC active high?
14. * Is VSYNC active high?
15. * Does the no. HSYNC pulses/field need to match?
16. * Does the field duration need to match?
17. * Does the HSYNC pulse width need to match?
18. ** Is there a color lock?
19. ** Does the present test pertain to S-Video or composite?
20. ** Was SECAM color decoding detected?
21. ** Was PAL color decoding detected?
22. ** Was a U.S. crystal used?

A single asterisk refers to a two bit indicator which specifies "care/don't care", yes or no. For example, the interlaced bit pair specifies whether the processor 200 cares if the incoming video signal is an interlaced signal and, in the event that the processor does care, this bit pair further indicates whether or not the incoming video signal is an interlaced signal. Note that when a new entry is made in the measurement table 252, the "care" bit of each of the bit pairs is true. A double asterisk identifies those characteristics that are only valid for broadcast video signals.

The characteristic description field $256_1$–$256_N$ of each entry in the factory table 250 includes some or all of the characteristics listed in Table I above. However, since such entries are associated with previously known video sources and corresponding previously known ranges or variant characteristics thereof, some of the characteristics associated with a particular known video source may be omitted.

The tuning adjustment fields $264_1$–$264_M$ of the measurement table 252, as well as like fields $258_1$–$258_N$ of the factory table 250, include the following tuning adjustments: contrast, brightness, centering (both vertical and horizontal), phase fine tuning (i.e., an adjustment by which the image is aligned to the display grid in sub-pixel increments) and HCNT (i.e., the number of pixel times/line). When a new entry is made in the measurement table, default tuning adjustments are entered. Thereafter, such tuning adjustments may be updated in response to user actuation of tuning controls.

As noted above, the video source name contained in the video source name fields $261_1$–$261_M$ of the measurement table 252 contain names generated from measured characteristics contained in the respective characteristic description field $262_1$–$262_M$. In one embodiment, the video source name fields $261_1$–$261_M$ contain the field duration, the number of HSYNC pulses/field, the number of pixels/line which is determined in a manner below and the number of its entry in the measurement table. Use of the video source name field in the measurement table 252 is for consideration by the system operator and is not necessary for video signal processing.

While the factory table 250 includes wholly predetermined characteristic description fields $256_1$–$256_N$, the measurement table 252 includes wholly measured, or learned characteristic description fields $262_1$–$262_M$. Stated differently, while the entries $254_{1-254N}$ in the factory table 250 are limited to those video sources known at the time of manufacture and which the table can accommodate, the measurement table 252 is provided with new entries each time an input signal from a new video source (i.e., not previously known or processed) is received. Moreover, while some of the characteristics associated with known video sources may be unknown, variable or unavailable, rendering the corresponding characteristic description field $256_1$–$256_N$ of the factory table 250 incomplete, the characteristics comprising the characteristic description fields $262_1$–$262_M$ of the measurement table 252 are measured, thereby avoiding incomplete entries. As will become apparent, the presently described arrangement of combining information contained in the factory table 250 with measured information stored in the measurement table 252 eliminates constraints associated with conventional systems which are capable of processing video signals from only a limited number of sources having pre-identified characteristics.

The characteristics of an incoming video signal which are measured are listed in Table II below along with the corresponding control parameters set in response to each measured characteristic. Note that the list of measured characteristics in Table II differs from the characteristics in Table I since Table I specifies the format of the characteristic description fields $256_1$–$256_N$ and $262_1$–$262_M$, whereas Table II lists the measured characteristics more generally.

TABLE II

| Measured characteristic | Control parameters |
| --- | --- |
| 1. Broadcast source vs. Computer source vs. No source | Image and sync routing<br>For scaled images, select between scaling algorithms<br>Control gain in PLL responsiveness<br>Set sensitivity of software's glitch-skipping logic<br>Sync routing for data capture<br>Sync routing for HSYNC width measurement |
| 2. Computer: Number of signal wires | |
| 3. Broadcast: 1 or 2 wire (composite or S-video) | Image and sync routing<br>Lack of carrier-detect implies need to try another color decoding algorithm or monochrome signal |
| 4. Broadcast only: color carrier detected? | |
| 5. Polarity of HSYNC/VSYNC | Define start of frame/line period as the rising or falling edge of sync<br>Tell HSYNC width measurement whether to time high or low part<br>Enters into pixel clock estimation<br>When scaling images up or down, helps set scaling factor |
| 6. # of HSYNC pulses/field | Broadcast only: selects NTSC (525 line/frame) vs. PAL/SECAM (625 line/frame) color decoding algorithms<br>Enters into pixel clock estimation<br>Affects how data is captured into frame buffer and recovered for display on the panel |
| 7. Duration of field | |
| 8. Interlace: yes/no | Let PLL maintain lock to HSYNC during VSYNC interval or cut off phase comparison during VSYNC |

TABLE II-continued

| Measured characteristic | Control parameters |
| --- | --- |
| 9. Serration present: yes/no | Set start of clamp period (part of clamp timing)<br>Set start of data capture, since image data is assumed never to occur during HSYNC |
| 10. Width of HSYNC pulses | |

As will be described further below in conjunction with FIG. 9, once such characteristics are measured, they are compared with the characteristic description field of entries in the measurement table 252 and the factory table 250 of memory 204. If such measured characteristics are determined to match any such entry, then the corresponding tuning adjustment field of the matching memory entry is retrieved for use in processing the input video signal. Additionally, the measured characteristics are used to set corresponding control parameter(s) of the video interface system.

The way in which the measurements of each of the video signal characteristics listed in Table II are performed will now be described with reference to FIGS. 1–3. Considering first the determination of whether the video source is a broadcast or computer source and the number of signal wires on which the input video signal is carried, recall that the video interface system 10 may receive video signals from a computer video source, a broadcast video source or from both types of sources simultaneously. The processor 200 (FIG. 3) has access to the incoming SYNC signal lines 28a–d via the timing generator 154 and data bus 108. More particularly, a selector within the timing generator 154 couples a selected one of the signal lines 28a–28d to the processor under the processor's control.

Initially, the processor 200 looks for a separate SYNC computer video signal (i.e., a five wire protocol) by accessing signal line 28c (FIG. 2) and performing the process of FIGS. 7 and 7A by which it is determined, inter alia, whether valid VSYNC and HSYNC pulses are being received. In the event that valid VSYNC pulses are not detected on line 28c, then the processor 200 accesses signal line 28b to determine whether a digital composite SYNC computer video signal (i.e., a four wire protocol) has been received by performing the process of FIGS. 5 and 5A. In the event that valid VSYNC pulses are not detected on line 28b, then signal line 28a is accessed and the process of FIGS. 5 and 5A is again performed to determine whether a computer video signal of the "SYNC on green" type is being received (i.e., a three wire protocol). Finally, signal line 28d is accessed and the process of FIGS. 5 and 5A performed to determine whether the system is receiving a broadcast video signal of either the composite or S-Video type.

Once the processor 200 determines whether the interface system 10 is receiving interface signals from a broadcast source, a computer source or both in the above-described manner, the processor 200 appropriately positions the switch 32 (FIGS. 1 and 3) in order to accomplish image routing (i.e., selecting either computer or broadcast video signals for display). More particularly, if the input video source is determined to be a computer video source, then the switch 32 is set to position 32a to connect the output of the computer video sampler 20 to the data formatter 24; whereas, if the input video source is determined to be a broadcast video source, then the switch 32 is toggled to position 32b to connect the output of the broadcast video sampler 22 to the data formatter 24. In the event that the processor 200 determines that the interface system 10 is receiving video signals from both a computer video source and a broadcast video source, then the switch 32 is positioned in accordance with the pre-programmed user preference.

Like all of the characteristic measurements described herein, the determination as to whether the input video source is a broadcast or a computer video source is continuously performed. This continuous determination is particularly important where the user has specified a preference for a video source type which is not presently being received by the interface system 10. For example, consider the case where the user has specified a preference to process broadcast video signals. If the processor 200 determines that the only received input video signal is a computer video signal, then continuous checking of the SYNC signal line 28d may reveal subsequent receipt of a broadcast video signal, in which case the position of switch 32 will be toggled to position 32b to process the subsequently received broadcast video signal in accordance with the user's preference. Also, it is common for computers to change their video output format in different applications or phases of operation or start up and shutdown.

The determination as to whether the input video source is a computer or broadcast video source is additionally useful in SYNC routing. To this end, once the processor 200 determines the type of input video source, a second selector within the timing generator 154 is controlled to select the SYNC signal line 28a–28d on which the incoming SYNC signals are carried. The selected SYNC signal line is used by the timing generator 154 to determine when to command the data formatter 24 to start sampling. More particularly, the timing generator 154 uses the HSYNC pulses received on the specified one of the SYNC lines 28a–d in order to generate the FGACTL signals which instruct the data formatter when to start sampling an incoming signal.

Knowledge of the type of input video source is additionally useful in selecting between different scaling techniques in the event that the image of the input signal must be scaled to fit on the display 30. More particularly, scaling is achieved in a different manner for broadcast and computer video signals. Since computer video signals have a pixel structure, such signals are sampled at the pixel rate, or a sub-multiple thereof, prior to scaling. Once the pixels of an incoming video signal are sampled, a predetermined number of such pixel samples are discarded in order to reduce the image size or a pixel sample is replicated every predetermined number of pixels in order to increase the image size. This general technique is applicable to both horizontal scaling performed by the data formatter 24 and vertical scaling performed by the VRAM controller 62, with lines being replicated or discarded in the case of vertical sampling. Broadcast video signals, on the other hand, have no inherent pixel structure. In the illustrative embodiment, the manner by which broadcast video signals are scaled is by varying the number of samples taken by the broadcast video digitizer 22 according to a pixel rate set by the PLL circuit 26. The data formatter 24, timing generator 154 and the VRAM controller 62 which perform the horizontal and vertical scaling functions, respectively, are alerted to the type of input video source by the processor 200 so that the appropriate type of scaling can be performed.

The processor 200 additionally sets an internal gain in the PLL circuit 26 via the HIGAIN signal 225 (FIG. 3A) in response to whether the input video source is a broadcast video source or a computer video source. One final use of the determination of the type of input video source is in glitch skipping logic implemented by the processor 200 and omitted from the code of FIGS. 5 and 7 for simplicity. The glitch skipping logic serves to de-sensitize the signal measurement software from what may appear to be false SYNC pulses, particularly on VCR driven broadcast signals, by measuring the duration between HSYNC pulses (i.e., the measured line duration). If this time is less than a predetermined value, then it is determined that the HSYNC pulses do not indicate a true "end of line" event. In this way, false HSYNC pulses are ignored. However, the glitch skipping logic cannot be used on computer video signals since the predetermined value to which the measured line time is compared may correspond to a valid portion of a computer video signal, thereby causing valid computer signal events to be erroneously ignored. In the illustrative embodiment, when the processor 200 determines that the input video source is a computer video source, the predetermined time to which a measured line duration is compared is reduced to zero.

The determination of the number of wires of the computer video protocol is used to control SYNC routing, separately for data capture and for the HSYNC width measurement (see item 10 in Table II above). More particularly, the SYNC routing for data capture refers to the control of the second selector within the timing generator 154 by which the appropriate one of the SYNC signal lines 28a–28d is selected, as noted above. SYNC routing for the HSYNC width measurement refers to use of appropriate SYNC information in the measurement of the width of the HSYNC pulses. As will be discussed further below, the HSYNC width measurement is performed in the timing generator 154.

In the event that it is determined that the input video source is a broadcast video source, the processor 200 further determines whether the broadcast video source is of the one wire protocol (a composite broadcast video source) or the two wire protocol (an S-Video source). This determination is achieved with the use of the color decoder 12c (FIG. 2). More particularly, the processor 200 makes an initial assumption, for example, that the broadcast video source is a composite video source. This assumption is conveyed to the color decoder 12c via SDA and SCL signals on signal bus 21. In response, a status bit output signal is provided by the color decoder 12c to the processor 200 which indicates whether, in fact, the assumption of a composite broadcast video source is correct. In the event that this initial assumption is incorrect, the processor 200 conveys a new assumption, that the broadcast video source is an S-Video source, to the color decoder 12c. Again, the processor 200 monitors the status bit output signal of the color decoder 12c to determine whether, in fact, this S-Video assumption is correct.

This determination of whether the broadcast video source is a one wire or two wire source is used to set the appropriate position of switch 23 (FIG. 2). More particularly, if it is determined that the broadcast video source is of the composite type, then the composite signal is provided on the chroma signal line 16b and the switch 23 is positioned to connect signal line 16b to the broadcast SYNC separator 12b. If, on the other hand, it is determined that the broadcast video source is of the S-Video type, then the switch 23 is positioned to select the luma signal line 16a for coupling to the broadcast sync separator 12b. Additionally, the determination of the type of broadcast video source is used for image routing. Based on whether the broadcast video source is a one wire or a two wire source, the color decoder 12c (FIG. 2) is instructed as which input line to access to appropriately decode the broadcast video signal.

The processor 200 additionally determines whether a color carrier is detected in the case of a broadcast video source (see item 4 in Table II above). This is achieved by reading the status bit output signal of the color decoder 12c. The absence of a color carrier indicates that the broadcast video signal is monochrome. However, the absence of detecting a color carrier can also indicate that the color decoder 12c is attempting to use an algorithm which is inappropriate for the coding scheme of the particular broadcast video signal. For example, if the color decoder 12c is trying to translate NTSC signals while the broadcast video signals are PAL signals, then a color carrier will not be detected. Thus, when it is determined that a color carrier is not detected, the processor 200 instructs the color decoder 12c to use an alternative decoding algorithm. This process is repeated until the processor 200 has instructed the color decoder 12c to attempt to decode the incoming broadcast video signals in accordance with all of the known broadcast video encoding schemes. Thereafter, assuming that a color carrier is still not detected, it is determined that the broadcast video signal is a monochrome signal.

Referring also to FIGS. 5 and 5A, the process by which several of the characteristics listed in Table II above are measured will be described. Specifically, the pseudocode of FIGS. 5 and 5A illustrates how it is determined whether and what type of video signal is being received (item 1 in Table II above), how the polarity of the VSYNC and HSYNC pulses are detected (item 5 in Table II above), how the number of HSYNC pulses per field is determined (item 6 in Table II above), how the field duration is measured (item 7 in Table II above), how it is determined whether or not the incoming video signals are interlaced signals (item 8 in Table II above) and whether or not the incoming video signals contain serration pulses (item 9 in Table II above). More particularly, FIGS. 5 and 5A illustrate the process by which these characteristics are determined in the case of a composite SYNC video signal (i.e., a broadcast video signal, a three wire computer video signal or a four wire video signal).

In steps 300, 302 and 304, logical registers are initialized. These registers are the HSyncCnt, the FieldCnt and the PolarityCnt registers. In step 306, a maximum measurement time is set by setting a GiveUpTime register equal to the CURRENT_TIME plus two times a MaxSupportedFieldTime value. The CURRENT_TIME indicates the true lapsed time and the MaxSupportedFieldTime represents the longest field time of any supported video source (i.e., the source with the slowest vertical refresh rate).

The SYNC_LEVEL signal is the composite SYNC signal to which the processor 200 is responsive (i.e., on signal line 28a in the case of a three wire video source, on signal line 28b in the case of a four wire video source and on signal line 28d in the case of a broadcast composite SYNC signal). The HALF_SYNC signal is generated in response to the SYNC_LEVEL signal and toggles upon each falling edge of the SYNC_LEVEL signal.

During steps 308, 310 and 312, the processor 200 waits for the SYNC_LEVEL signal to fall. This is achieved by setting a PreviousHalf register to the value of the HALF_SYNC signal and waiting until the HALF_SYNC signal changes polarity. The processor 200 idles for as long as the HALF_SYNC signal remains unchanged and the CURRENT_TIME is less than or equal to the GiveUpTime. Note that the processor 200 will not wait forever for a transition of the HALF_SYNC signal, but only until the GiveUpTime lapses.

In step 315, the PreviousHalf register is set to the present value of the HALF_SYNC signal. According to loop 316, for as long as the polarity of the HALF_SYNC signal remains unchanged and the CURRENT_TIME is less than or equal to the GiveUpTime, the PolarityCnt register is incremented if the SYNC_LEVEL signal is one and otherwise is decremented. Once the polarity of the HALF_SYNC signal changes, loop 316 is terminated. Once the first transition of the HALF_SYNC signal is detected and processed in accordance with steps 315 and 316, a loop 318 is performed for three detected transitions of the PolarityCnt sign between positive and negative (i.e., N=1, 2 and 3).

Specifically, loop 318 is performed for as long as the CURRENT_TIME is less than or equal to the GiveUpTime. In loop 318, the value in a PreviousPolarity register is set to the present value of the PolarityCnt register. Thereafter, and for as long as the sign of the PreviousPolarity register is the same as the sign of the PolarityCnt register, the PolarityCnt register is set equal to zero and the PreviousHalf register is set equal to the HALF_SYNC signal value.

In a sub-loop 322, the PolarityCnt register is incremented or decremented. More particularly, the sub-loop 322 is repetitively performed for as long as the HALF_SYNC signal polarity remains unchanged and the CURRENT_TIME is less than or equal to the GiveUpTime. During this loop, the PolarityCnt register is incremented if the value of the SYNC_LEVEL signal is high. Alternatively, the PolarityCnt register value is decremented. Once the value of the HALF_SYNC signal transitions, then the value in the HSyncCnt register is incremented by one, following which loop 320 is terminated. Thereafter, in steps 324 and 326, the CURRENT_TIME is stored in a VEdgeTime.N register and the HSyncCnt register value is stored in a VEdgeHCnt.N register. Finally, in step 328, the FieldCnt register is set equal to the previous value of the FieldCnt register plus the value of an INTERLACE signal, which is generated by the clock/timing generator 44 (FIG. 3) and specifies the current field type, even or odd, of a potentially interlaced signal. After step 328, loop 318 is terminated. Loop 318 is repeated however, for N=2 and N=3 (i.e., the second and third transitions of the PolarityCnt sign).

Once loop 318 has been iterated three times, the following characteristics associated with the incoming video signal are determined as specified by FIG. 5A: whether the video signal is an interlaced signal, whether serration pulses are present, the duration of the field, the number of HSYNC pulses per field and the polarity of the VSYNC and HSYNC pulses. At step 330, it is determined whether the CURRENT_TIME is greater than the GiveUpTime. In the event that the CURRENT_TIME is greater than the GiveUpTime, then the process of FIG. 5 took longer than is reasonable for a valid signal. However, if the HSyncCnt register value is significantly greater than zero, then a Video Electronics Standards Association (VESA™) Display Power Management Signaling (DPMS™) state is indicated. Otherwise, it is determined that a valid input video signal has not been received. A VESA™ DPMS™ state is a occurs when the video display is put into a low power consumption state as is governed by the VESA™ DPMS™ Standard entitled "Display Power Management Signaling (DPMST) Standard", Version 1.0, dated Aug. 20, 1993.

According to step 334, a FieldCnt register value of either 1 or 2 indicates a changing field ID value (i.e., an interlaced video signal). Alternatively, a FieldCnt register value of either 0 or 3 is indicative of an unchanging field value (i.e., a progressive scan video signal).

In order to determine whether the incoming video signal has serration pulses in step 336, the values in the VEdgeHCnt.N registers are used. Specifically, it is determined whether VEdgeHCnt.3−VEdgeHCnt.2 and VEdgeHCnt.2−

VEdgeHCnt.1 are both greater than one. If this is the case, then the incoming video signal includes serration pulses.

The total field time is determined in step 338 by subtracting the value in the VEdgeTime.1 register from the value in the VEdgeTime.3 register. The number of HSYNC pulses per field is determined by subtracting the value in the VEdgeHCnt.1 register from the value in the VEdgeHCnt.3 register.

In order to determine whether the VSYNC and HSYNC pulses of the incoming video signal are active high or active low, it is determined whether the VEdgeTime.3 register value minus the VEdgeTime.2 register value is greater than the VEdgeTime.2 register value minus the VEdgeTime.1 register value. If this inequality is true, then a negative PolarityCnt value indicates that the VSYNC and HSYNC pulses are active low; whereas, if this inequality is not true, then a negative PolarityCnt value indicates the VSYNC and HSYNC pulses are active high.

Figure 6:
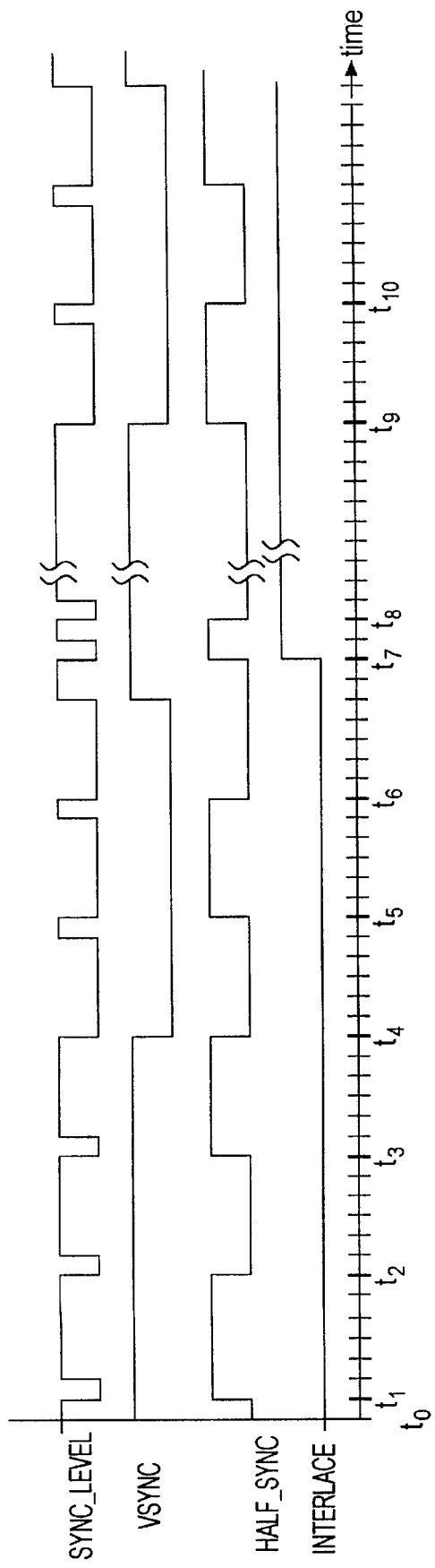
FIG. 6 is a timing diagram showing an illustrative composite input video signal.

Referring also to the illustrative SYNC_LEVEL, HALF_SYNC and INTERLACE signals of FIG. 6 and the operational sequence of FIG. 6A, the operation of the code of FIGS. 5 and 5A will now be illustrated. Note that while the VSYNC signal is shown in FIG. 6 for clarity, in the composite SYNC case on which the code of FIGS. 5 and 5A operates, the VSYNC information is encoded with other information on signal line 28a or 28b (FIG. 2). Recall that in steps 300, 302 and 304, the HSyncCnt, FieldCnt and PolarityCnt registers are initialized to zero. Thereafter, in step 306 (FIG. 5) corresponding to operation 344 in FIG. 6A, the GiveUpTime register is set equal to the CURRENT_TIME of $t_0$ plus two times the MaxSupportedFieldTime. In step 308, the PreviousHalf register is set equal to the value of the HALF_SYNC signal which, between times $t_0$ and $t_1$, is zero, as indicated at operation 346 (FIG. 6A). Once the HALF_SYNC signal transitions, at time $t_1$, step 315 performed. This phase of execution brings the code into a known position relative to the HSYNC pulses, even though pulse polarity of the composite SYNC_LEVEL signal is not yet clear.

In operation 348 (corresponding to step 315 in FIG. 5), the PreviousHalf register is set to the value of the HALF_SYNC signal, or one. In loop 316, which is performed for as long as the HALF_SYNC signal remains high and the CURRENT_TIME is less than or equal to the GiveUpTime, the value in the PolarityCnt register is incremented or decremented as appropriate. Specifically, and assuming loop 316 is iterated once per tick mark on the horizontal axis of FIG. 6, the value of the PolarityCnt register is initially decremented from 0 to −1 since, at the first iteration of loop 316, the SYNC_LEVEL signal is low. Thereafter, and for the next four iterations of the loop 316, the value of the PolarityCnt register is incremented so that, by time $t_2$, the value in the PolarityCnt register is +3, as specified by operation 348 in FIG. 6A.

Since time $t_1$ corresponding to the end of a partial pulse of unknown polarity, time $t_2$ denotes the end of the first complete SYNC cycle during measurement. Having executed through one complete SYNC cycle at time $t_2$, one pulse polarity measurement is now complete and reliable. Since VSYNC is encoded as transitions of sync pulse polarity, time $t_2$ when the first pulse polarity is known is the time after which changes of pulse polarity can be detected.

Loop 316 terminates at time $t_2$ since the value of the HALF_SYNC signal transitions. Starting at time $t_2$, loop 318 is performed, as illustrated by operation 350. Initially, the value in a PreviousPolarity register is set equal to the current value in the PolarityCnt register, or +3. Then, sub-loop 320 is performed for as long as the sign in the PreviousPolarity register is equal to the PolarityCnt sign and the CURRENT_TIME is less than or equal to the GiveUpTime. Initially in sub-loop 320, the PolarityCnt register is set to zero. Also, the value in the PreviousHalf register is set equal to the value of the HALF_SYNC signal which, starting at time $t_2$, is zero. Sub-loop 322 is then performed for as long as the HALF SYNC signal remains unchanged (i.e., until time $t_3$). During this interval, the PolarityCnt register is incremented or decremented depending on the value of the SYNC_LEVEL signal. Specifically, when the value of the SYNC_LEVEL signal is low, the PolarityCnt register is decremented whereas, when the value of the SYNC_LEVEL signal is high, the PolarityCnt register is incremented. Thus, between time $t_2$ and $t_3$, the PolarityCnt register is initially decremented during the first iteration of loop 322, but is thereafter incremented during the remaining four iterations of loop 322, so that, at time $t_3$1 the value in the PolarityCnt register is +3. The HSyncCnt register is then incremented by one to a value of one, following which sub-loop 320 is terminated.

Sub-loop 320 is repeated, however, for as long as the sign in the PreviousPolarity register is equal to the sign of the PolarityCnt register. Since the sign of the PolarityCnt register represents the polarity of the current pulse, the sign of the PreviousPolarity register represents the polarity of the previous pulse and VSYNC is encoded as a change of pulse polarity, sub-loop 320 represents the search for a transition into or out of a VSYNC interval. At time $t_3$, the PreviousPolarity register contains a positive value and the PolarityCnt register is also at a positive value. Thus, loop 320 is repeated a second time as indicated at operation 352 (FIG. 6A). Specifically, the PolarityCnt register is initialized to zero and the PreviousHalf register is set equal to the value of the HALF_SYNC signal which, at time $t_3$, is 1. Also, sub-loop 322 is performed as described above. Since the SYNC_LEVEL signal is again initially low at time $t_3$ and thereafter is high, the PolarityCnt register is initially decremented during the first iteration of loop 322, following which the PolarityCnt register is incremented for the remaining four iterations of loop 322 between times $t_3$ and $t_4$. Thereafter, the HSyncCnt register is incremented by one, to a value of two and loop 320 is terminated.

Since the value in the PreviousPolarity register is positive and the PolarityCnt register is positive, loop 320 is again repeated as indicated at operation 354, representing the continued search for a VSYNC edge. Again, the PolarityCnt register is cleared to zero and the PreviousHalf register is set equal to the value of the HALF_SYNC signal, or zero. Since the SYNC_LEVEL signal is low for the first four iterations of loop 322 and is thereafter high for the last iteration of loop 322, the PolarityCnt register is decremented four times to −4, and is thereafter incremented once, to −3. Thereafter, the HSyncCnt register is incremented to three.

Since, at time $t_5$, the sign in the PreviousPolarity register (i.e., positive) is not the same as the sign of the PolarityCnt register (i.e., negative), loop 320 is terminated and operations 356 (i.e., corresponding to steps 324, 326 and 328 of FIG. 5) are performed. Specifically, the VEdgeTime.1 register is set equal to the CURRENT_TIME of $t_5$, and the VEdgeHCnt.1 register is set equal to the current HSyncCnt register value of 3. Also, the FieldCnt register is set equal to its initial value of zero plus the value of the INTERLACE signal (FIG. 6), which is also zero. This concludes the N=1 pass of loop 318. Depending on the polarity of the composite SYNC signal, time $t_5$, also denotes a transition into or out of the VSYNC interval.

Loop 318 is then repeated starting at time $t_5$ for N=2. Specifically, the PreviousPolarity register is set equal to −3, the current value in the PolarityCnt register. Thereafter, operation 358, corresponding to the first pass of loop 320, is performed for as long as the sign in the PreviousPolarity register (i.e., negative) remains equal to the sign of the PolarityCnt register. The PolarityCnt register is initialized to zero and the PreviousHalf register is set equal to the value of the HALF_SYNC signal, or one. The PolarityCnt register is then incremented or decremented in accordance with the level of SYNC_LEVEL signal in sub-loop 322. Specifically, during the interval from $t_5$ to $t_6$, the SYNC_LEVEL signal is low for the first four iterations and is thereafter high for the last iteration. Thus, the PolarityCnt register is decremented four times to −4 and is thereafter incremented once to −3. This concludes loop 322, following which the HSyncCnt register is incremented by one, to four.

Since the sign of the PreviousPolarity register is the same as the sign of the PolarityCnt register, sub-loop 320 is repeated as indicated by operations 362. This repetition represents the ongoing search for another pulse polarity change (i.e., another VSYNC edge). Initially, the PolarityCnt register is set equal to zero and the PreviousHalf register is set equal to the current value of the HALF_SYNC signal, which is zero. The PolarityCnt register is decremented for the first four iterations of sub-loop 322, following which the SYNC_LEVEL signal transitions to and holds a logic high level for the next two iterations of the sub-loop, causing the PolarityCnt register to be incremented two times. Thus, the PolarityCnt register is at −2 at time $t_7$.

Thereafter, between times $t_7$ and $t_8$, the PolarityCnt register is initialized to zero and the PreviousHalf register is set equal to the current value of the HALF_SYNC signal, or one. The PolarityCnt register is decremented once and then incremented twice, to a value of +1, in accordance with the level of the SYNC_LEVEL signal. The HSyncCnt value is then incremented by one, to a value of six.

Since, at time $t_8$, the PolarityCnt sign is positive and the PreviousPolarity sign is negative, loop 320 is terminated and operation 370 is performed, corresponding to steps 324, 326 and 328 (FIG. 5), in which statistics associated with the N=2 iteration of loop 318 are recorded. This difference between the signs of PreviousPolarity and PolarityCnt represents another transition between the VSYNC and image intervals. At this point, however, the relative lengths of the active high and active low intervals and the signal polarity are not yet known, so no decision is yet made as to whether $t_8$ represents detection of entry into or exit from the VSYNC interval. In operations 370, the VEdgeTime.2 register is set equal to the CURRENT_TIME $t_8$ and the VEdgeHCnt.2 register is set equal to the current value of the HSyncCnt register, or six. Finally, the FieldCnt register is set equal to the previous FieldCnt value plus the current value of the INTERLACE signal, or one.

Finally, the loop 318 is repeated again for N=3. To this end, at time $t_8$, the PreviousPolarity register is set equal to the PolarityCnt register value of one, following which sub-loop 320 (FIG. 5) is performed for as long as the PolarityCnt register is positive, like the PreviousPolarity value. As indicated by operations 372, during the first iteration of loop 320, the PolarityCnt register is set equal to zero and the PreviousHalf register is set equal to zero. The curved lines on the signals of FIG. 6 between times $t_8$ and $t_9$ indicate that this interval is longer than shown and corresponds to the interval during which the signal data is transmitted. Thus, at time $t_9$, it will be assumed that the HSyncCnt register has been incremented to +300. The PolarityCnt register is incremented or decremented according to the value of the SYNC_LEVEL signal.

Since the PolarityCnt register is positive, loop 320 is repeated again between times $t_9$ and $t_{10}$ as illustrated by operations 374. At the end of this interval, at time too, the PolarityCnt register becomes negative. This causes loop 320 to terminate at time $t_{10}$, followed by steps 324, 326 and 328 as indicated at operation 376 in FIG. 6A. Specifically, the VEdgeTime.3 register is set equal to the CURRENT_TIME of $t_{10}$, the VEdgeHCnt.3 register is set equal to the current HSyncCnt value of 301 and the FieldCnt register is incremented by the current INTERLACE signal value to two.

As described above, whether the incoming video signal is an interlaced signal or not depends on the value of the FieldCnt register after the steps of FIG. 5 are performed. Specifically, since the FieldCnt register is equal to two, this indicates that the incoming video signal is an interlaced signal. In determining whether the video signal includes serration pulses, it is observed that VEdgeHCnt.3−VEdgeHCnt.2 is equal to 295 and VEdgeHCnt.2−VEdgeHCnt.1 is equal to 3. Since both such differences are greater than one, the incoming video signal is determined to include serration pulses.

The total field time is determined by VEdgeTime.3−VEdgeTime.1 and thus, is equal to the interval between $t_{10}$ and $t_5$. Also, the total number of HSYNC pulses is equal to VEdgeHCnt.3−VEdgeHCnt.1, or 298 (most of which occur in the active data portion of the video signal).

In the present example, VEdgeTime.3−VEdgeTime.2 is equal to $t_{10}-t_8$; whereas, VEdgeTime.2−VEdgeTime.1 is equal to $t_8-t_5$. Thus, since VEdgeTime.2−VEdgeTime.1 is shorter than VEdgeTime.3−VEdgeTime.2, the negative PolarityCnt register value indicates that the VSYNC and HSYNC pulses are active low pulses, as is apparent from FIG. 6.

Referring now to FIGS. 7 and 7A, pseudocode is provided which is illustrative of the process by which the characteristics numbered 5–9 in Table II above are measured for a separate SYNC computer video signal (i.e., a five wire protocol). The VSYNC_LEVEL signal is the VSYNC information of the incoming video signal and the HSYNC_LEVEL signal is the HSYNC information of the incoming video signal. The HALF_HSYNC signal is generated in response to the HSYNC_LEVEL signal and transitions upon each falling edge of the HSYNC_LEVEL signal.

Initially, in steps commonly labelled 400, several registers are initialized to zero. These registers are the: HSyncCnt, FieldCnt, HPolTotal and VPolarity registers. Thereafter, a maximum time is set, corresponding to the maximum time during which the signal characteristic measurements should be completed. To this end, a GiveUpTime register is set equal to the CURRENT_TIME plus two times the MaxSupportedFieldTime value. Once this maximum measurement time (i.e., the GiveUpTime) is set in step 402, a PreviousHalf register is set equal to the current value of the HALF_HSYNC signal in step 404. Thereafter, the processor waits for a HALF_HSYNC signal transition in a loop 406. More particularly, for as long as the HALF_HSYNC signal remains unchanged and the CURRENT_TIME is less than or equal to the GiveUpTime, the processor 200 idles. Note that the processor 200 will not wait forever for a transition of the HALF_HSYNC signal, but only until the GiveUpTime lapses. Absent or faulty SYNC signals, thus, do not cause the processor to become hung up for excessive periods of time. This phase of execution (loop 406) synchronizes the measurement to the start of the first complete HSYNC pulse.

Thereafter, a loop 410 is performed three times for N=1 to N=3, where N corresponds to an edge, or transition, of the VSYNC_LEVEL signal. In a loop 412, it is determined whether the CURRENT_TIME is greater than the GiveUpTime. In the event that the CURRENT_TIME exceeds the GiveUpTime, then loop 410 is exited. This would occur if the process takes longer than is reasonable (i.e., an error condition). Assuming that the CURRENT_TIME is less than or equal to the GiveUpTime, then step 413 is performed in which an HPolarity register is initialized to zero and a PreviousHalf register is set to the current value of the HALF_HSYNC signal. In a subsequent step 414 a PreviousVert register is set to the current value of the VSYNC_LEVEL signal. A loop 418 is then performed for as long as the VSYNC_LEVEL signal does not transition.

In loop 418, the CURRENT_TIME is continuously checked in a sub-loop 420 to see whether the CURRENT_TIME exceeds the GiveUpTime. In the event that the CURRENT_TIME exceeds the GiveUpTime, then the loop 418 is terminated. Assuming that the CURRENT_TIME is less than or equal to the GiveUpTime, then steps 424 are performed for as long as the PreviousHalf register value does not equal the current value of the HALF_HSYNC signal. In particular, in a subsequent test 426, the VPolarity register is incremented or decremented in accordance with the level of the VSYNC_LEVEL signal. If the VSYNC_LEVEL signal is high, then the VPolarity register is incremented by one. If the VSYNC_LEVEL signal is low however, the VPolarity register is decremented by one.

Thereafter, in steps 428, the HPolTotal register is incremented or decremented in accordance with the sign of the HPolarity register. In particular, if the HPolarity register value is greater than zero, then the HPolTotal register is incremented by one. Otherwise, the HPolTotal register is decremented by one. In subsequent steps 430, the HSyncCnt register is incremented by one, the HPolarity register is set to zero and the PreviousHalf register is set to the current value of the HALF_HSYNC signal. Steps 432 are then performed in which the HPolarity register is incremented or decremented in accordance with the level of the HSYNC_LEVEL signal. More particularly, the HPolarity register is incremented if the HSYNC_LEVEL signal is high and is otherwise decremented. This concludes loop 418. Note however that loop 418 is repeated until the VSYNC_LEVEL signal transitions. Once the VSYNC_LEVEL signal transitions, then steps 440, 444 and 448 are performed in which certain statistics are recorded for the current iteration (i.e, N=1, 2 or 3) of loop 410. In step 440, a VEdgeTime.N register is set to the CURRENT_TIME. In step 444, a VEdgeHCnt.N register is set equal to the value of the HSyncCnt register. Finally, in step 448, the FieldCnt register is incremented in accordance with the current value of the INTERLACE signal.

Once loop 410 has been iterated three times, certain characteristics of the processed separate SYNC video signal are determined as specified in FIG. 7A. In the event that the CURRENT_TIME is greater than the GiveUpTime, the signal characteristic measuring process of FIG. 7 is determined to have taken longer than is reasonable for a realistic input video signal as specified at step 450. If this is determined to be the case, then the HSyncCnt register is monitored to determine whether its value is significantly greater than zero. In the event that the HSyncCnt register is significantly greater than zero, then a VESA™ DPMS™ state is indicated. Otherwise, it is determined that a valid input video signal has not been received.

In step 452, the FieldCnt register is monitored to determine its value. If the FieldCnt register is at a value of either one or two, a changing field ID value is indicated, specifying that the input video signal is an interlaced signal. Alternatively, if the FieldCnt register holds a value of zero or three, then an unchanging field value is indicated, representing a progressive scan input video signal.

Thereafter, in step 454, it is determined whether the input video signal includes serration pulses. This is achieved by determining whether the VEdgeHCnt.3 minus VEdgeHCnt.2 value and the VEdgeHCnt.2 minus VEdgeHCnt.1 value are both greater than one. In the event that both such inequalities are true, then the input video signal is determined to include serration pulses. In step 456, the total field time is determined by VEdgeTime.3 minus VEdgeTime.1 and the total number of HSYNC pulses per field is equal to VEdgeHCnt.3 minus VEdgeHCnt.1. The opposite of the sign of the VPolarity register indicates the polarity of the VSYNC pulses and the opposite of the sign of the HPolTotal register indicates the HSYNC pulse polarity, as specified in step 458.

Figure 8:
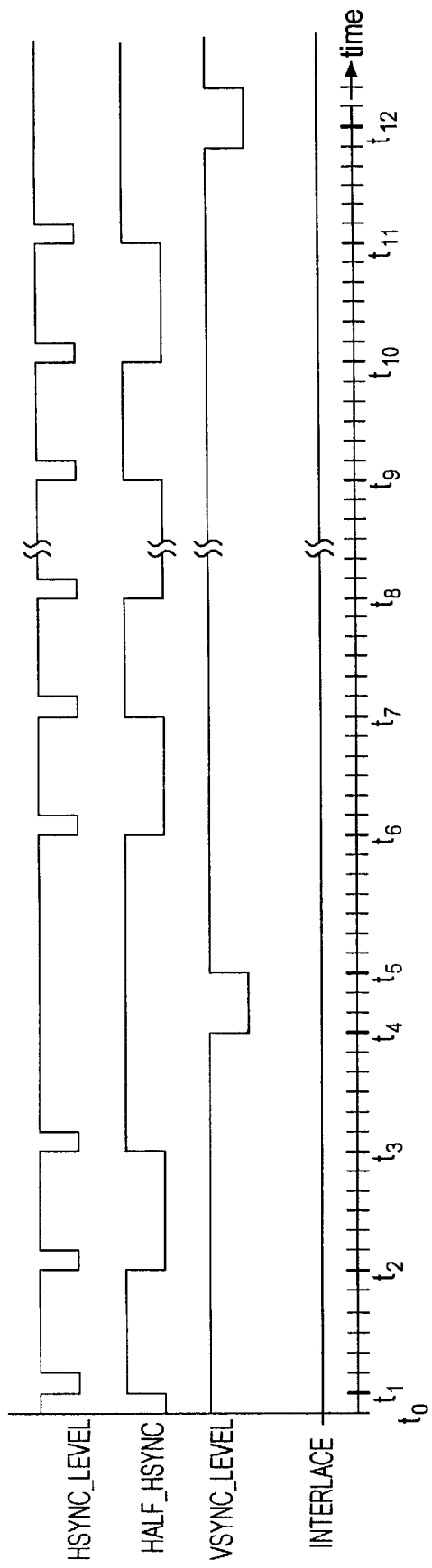
FIG. 8 is a timing diagram showing illustrative SYNC signals associated with a separate SYNC input video signal.

Referring now to the illustrative separate SYNC signals of FIG. 8 and the operation sequence listing of FIG. 8A, the process of FIGS. 7 and 7A will be illustrated. In step 460, the GiveUpTime register is set equal to the CURRENT_TIME of $t_0$ plus two times the MaxSupportedFieldTime. In step 462, corresponding to step 404 in FIG. 7, the PreviousHalf register is set equal to the current value of the HALF_HSYNC signal, or zero. The processor 200 idles until the value of the HALF_HSYNC signal transitions at time $t_1$.

Once a transition of the HALF_HSYNC signal is detected, loop 410 is performed for N=1. In operations 464 (corresponding to steps 413 and 414 in FIG. 7), the HPolarity register is initialized to zero, the PreviousHalf register is set equal to the current value of the HALF_HSYNC signal, or one, and the PreviousVert register is set equal to the current value of the VSYNC_LEVEL signal, or one.

Loop 418 is then executed for as long as the VSYNC_LEVEL signal remains unchanged (i.e., between $t_1$ and $t_4$). At time $t_1$, the PreviousHalf register value of one is equal to the value of the HALF_HSYNC signal, so steps 424 (FIG. 7) are skipped, as indicated at operation 466. Also, the HPolarity register is incremented or decremented in accordance with the level of the HSYNC_LEVEL signal. In particular, the HPolarity register is decremented once since the HSYNC_LEVEL signal is initially low, and is thereafter incremented four times, resulting in a HPolarity value of +3 at time $t_2$.

Between times $t_2$ and $t_3$, the HALF_HSYNC signal is not equal to the PreviousHalf value of 1, so steps 424 (FIG. 7) are executed, as indicated by operation 468. In particular, the VPolarity register is incremented by one since the VSYNC_LEVEL signal is high and the HPolTotal register is incremented by one since the HPolarity value is greater than one. Additionally, the HSyncCnt register is incremented by one to a value of one, the HPolarity register is set to zero and the PreviousHalf register is set equal to the current value of the HALF_HSYNC signal, or zero. Thereafter, in operation 470, the HPolarity register is decremented once and then incremented four times, in accordance with the level of the HSYNC_LEVEL signal.

Loop 418 (FIG. 7) is again repeated between times $t_3$ and $t_4$ as indicated at operations 472. During this sequence, the VPolarity register is incremented by one, to a value of two, since the VSYNC_LEVEL signal is high and the HPolTotal register is incremented by one, to a value of two, since the HPolarity register is at a value greater than zero. Also, the HSyncCnt register is incremented by one, the HPolarity register is set to zero and the PreviousHalf register is set to the current value of the HALF_HSYNC signal, or one. In subsequent operation 474 (corresponding to steps 432 in FIG. 7), the HPolarity register is initially decremented and then incremented four times, in accordance with the level of the HSYNC_LEVEL signal during this interval.

Since the VSYNC_LEVEL signal transitions at time $t_4$, steps 440, 444 and 448 are next performed, as indicated by operation 476 (FIG. 8A). The VEdgeTime.1 register is set to the CURRENT_TIME of $t_4$, the VEdgeHCnt.1 register is set to the HSyncCnt value of two and the FieldCnt register is set to the current register value plus the value of the INTERLACE signal, or in this case, to a value of zero.

Loop 410 is then repeated for N=2, starting at operations 478, in which the HPolarity register is set to zero, the PreviousHalf register is set to the current HALF_HSYNC signal value of one and the PreviousVert register is set to the current value of the VSYNC_LEVEL signal, or zero. Loop 418 is then until the next transition of the VSYNC_LEVEL signal at time $t_5$. Since the PreviousHalf register is equal to the current value of the HALF_HSYNC signal, steps 424 (FIG. 7) are skipped, as indicated at operation 480. Also in operation 480, the HPolarity register is incremented twice, corresponding to the high level of the HSYNC_LEVEL signal during the two tick marks between times $t_4$ and $t_5$. In operation 481, statistics regarding the N=2 iteration of loop 410 are recorded. Specifically, the VEdgeTime.2 register is set to the CURRENT_TIME of $t_5$, the VEdgeHCnt.2 register is set to the HSyncCnt value of two and the FieldCnt register remains unchanged at zero.

Subsequently, loop 410 is repeated for N=3, starting at operations 482 at $t_51$ when the HPolarity register is set to zero, the PreviousHalf register is set to the current value of the HALF_HSYNC signal, or one, and the PreviousVert register is set to the current value of the VSYNC_LEVEL signal, or one. Loop 418 is then repeated until the VSYNC_LEVEL signal transitions at time $t_{12}$. As indicated at operations 483, between times $t_5$ and $t_6$, loop 424 (FIG. 7) is skipped since the current value of the HALF_HSYNC signal is equal to one, the value of the PreviousHalf register. Also, the HPolarity register is incremented six times since the HSYNC_LEVEL signal is high for the six tick marks between times $t_5$ and $t_6$.

Loop 418 is repeated between times $t_6$ and $t_7$, as indicated at operations 484 and 485 and again between times $t_7$ and $t_8$, as indicated at operations 486 and 487. The curved lines between times $t_8$ and $t_9$ indicate that this duration is longer than shown and corresponds to the transmission signal data. At time $t_9$, it will be assumed that the HSyncCnt register has been incremented to +300, as specified by operations 488. The HPolarity register is incremented or decremented according to the value of the HSYNC_LEVEL signal during the respective interval as specified at operation 489.

Between times $t_9$ and $t_{10}$, loop 418 is again repeated as specified at operations 490 and 491. Specifically, the VPolarity register is incremented by one to 301 since the VSYNC_LEVEL signal is high, the HPolTotal register is incremented by one to 301 since the HPolarity value is greater than zero and the HSyncCnt register is incremented by one, to a value of 301. Additionally, the HPolarity register is set to zero and the PreviousHalf register is set to the current value of the HALF_HSYNC signal, or one. In operation 491, the HPolarity register is decremented once and is then incremented four times, in accordance with the level of the HSYNC_LEVEL signal. Loop 418 is repeated two more times, once between times $t_{10}$ and $t_{11}$ as illustrated by operations 492 and 493, and once between times $t_{11}$ and $t_{12}$ as illustrated by operations 494 and 495.

Steps 440, 444 and 448 (FIG. 7) are performed at time $t_{12}$ since the VSYNC_LEVEL signal transitions at this point. As specified at operations 496, the VEdgeTime.3 register is set to the CURRENT_TIME of $t_{12}$, the VEdgeHCnt.3 register is set to the current HSyncCnt register value of 303 and the FieldCnt register remains unchanged.

Thereafter the recorded statistics are used to determine several signal characteristics in accordance with the steps described above in conjunction with FIG. 7A. In particular, it is determined if the CURRENT_TIME is greater than the GiveUpTime. In the event that this is the case, then the HSyncCnt register value is observed to see if it is much greater than zero, indicating a VESA™ DPMS™ state. Otherwise, it is determined that a valid video signal has not been received. Since the FieldCnt register value is zero, an unchanging field value is indicated, in accordance with a progressive scan video signal.

Although VEdgeHCnt.3 minus VEdgeHCnt.2 is greater than zero (i.e., equals one), VEdgeHCnt.2 minus VEdgeHCnt.1 equals zero. In accordance with step 454 (FIG. 7A), the video signal does not contain serration pulses. The total field time is given by VEdgeTime.3 minus VEdgeTime.2, or $t_{12}-t_4$. The total number of HSYNC pulses in the processed frame is given by VEdgeHCnt.3 minus VEdgeHCnt.1, or 301. Finally, the VSYNC pulse polarity is active low since the VPolarity register value is positive and the HSYNC pulse polarity is active low since the HPolTotal register value is positive.

Having described how the characteristics numbered 5–9 in Table II above are determined, the control parameters in the video interface system 10 which are set in response to such measured characteristics will now be described. Knowledge of the detected source of SYNC signals is used to select the proper signal lines 28a–d as the timing generator's source of SYNC information. Specifically, and with reference to the determination of the polarity of the VSYNC and HSYNC pulses, this pulse polarity is used to define the start of a frame/line as either the rising or falling edge of a VSYNC/HSYNC pulse. In particular, the processor 200 (FIG. 3) indicates to the timing generator 154 the correct polarity of the SYNC signals. The SYNC polarity information is additionally used by the timing generator 154 in measuring the HSYNC pulse width, as described below.

The number of HSYNC pulses per field determined as described above, is used to appropriately scale (or not scale), an incoming video signal. Specifically, the number of HSYNC pulses per field indicates the number of active lines per field. If the number of lines per field of the incoming video signal is greater than can be displayed on the display 30, then the incoming signal may be vertically reduced. Alternatively, if the number of HSYNC pulses per field is less than the number of lines of the display 30, then the incoming video signal may be vertically expanded. The processor via the timing generator 154 provides information to the VRAM controller 62 as to which of several scaling factors (if any) are to be used to vertically scale the incoming video signal.

The determination of the number of HSYNC pulses per field is additionally used to provide a pixel clock estimation. The pixel clock estimation is an estimation of the number of pixel times per second associated with an incoming video signal. The pixel clock is estimated according to the following equation:

$$\frac{\text{Pixel Times}}{\text{second}} = \frac{\text{Fields}}{\text{second}} \times \frac{\text{Line } (HSYNCs)}{\text{field}} \times \frac{\text{Pixel Times}}{\text{line}} \times K \qquad (1)$$

where the number of fields per second and the number of lines per field are measured as described above in conjunction with FIGS. 5, 5A, 7 and 7A. The number of pixel times per line is an estimated value based on common image formats. Specifically, since the number of lines per field and common image formats are known, an assumption is made as to the most likely number of pixel times per line. Finally, the factor K is an image scale factor representing the amount of signal expansion or shrinkage for broadcast video sources and is 1.0 for all computer sources (although a computer video signal may still be scaled).

The estimation of the number of pixel times per line of the incoming video signal is used to establish the HCNT signal (FIG. 2) which determines the factor by which the divider circuit 236 operates. The pixel times per line estimate is also used to set a "buffer alignment" control which determines where to start loading data in the VRAM shift register of the frame buffers 58 to ensure that, once loaded, the data reaches the end of the shift register. The pixel times/second determination is also used to set up the BANDSEL signal 227 and SampleMode signal 231 (FIG. 3A).

The number of HSYNC pulses per field is additionally used, in the case of a broadcast video source, to select the appropriate decoding algorithm for operation in the color decoder 12c (FIG. 2). Specifically, since NTSC broadcast video sources have 525 lines per frame whereas, PAL and SECAM broadcast video sources have 625 lines per frame, the number of HSYNC pulses per field is used to determine which type of broadcast video source is providing the incoming video signal and thus, the appropriate type of color decoding to be performed.

The duration of the field (item 7 in Table II above) provides the fields/second value in the pixel clock estimation of equation 1, above. The determination of whether the incoming video signal is an interlaced signal or not affects how data is loaded into the frame buffers 58 (FIG. 3) and recovered by the display interface unit 40 for display. Thus, the processor 200 provides information as to whether or not the incoming video signal is an interlaced signal to the VRAM controller 62 for loading the frame buffers 58 and also to the display interface 40 for retrieving data from the frame buffers 58.

Whether or not the incoming video signal includes serration pulses, as determined above, is used to control the PLL circuit 26. In the event that serration pulses are present, the PLL circuit 26 is instructed by the processor 200 to continuously lock to the incoming video signal via the VSDIS signal 229 (FIG. 3A). Since the PLL circuit 26 is susceptible to drift in the event that serration pulses are not present, in the absence of serration pulses, the processor 200 causes the PLL circuit 26 to interrupt locking via the VSDIS signal 229. Stated differently, the serration information is used by the processor 200 as an enable/disable of the PLL locking functionality.

Considering finally how the width of the HSYNC pulses is measured (item 10 in Table II above), this measurement is made with timing logic in the timing generator 154 (FIG. 3). The timing generator 154 includes a free-running counter which is initiated by the processor 200. Specifically, the processor 200 instructs the timing generator 154 as to the polarity of the HSYNC pulses at which to start the counter. The width of the HSYNC pulses is measured by the counter.

Once measured, it is used to control a second counter in the timing generator 154 which sets the clamp period of the incoming video signal (i.e., an interval between an HSYNC pulse and the beginning of the video data). More particularly, the second counter repetitively counts from zero to the value of HCNT (i.e., the number of pixel times/line). At some time after the measured HSYNC pulse width, this counter passes through the start of a clamp period, at which time an indication of the start of the clamp period is provided by the state of a signal on bus 21 (FIG. 3). Another indicator is provided by such signal when the end of the clamp period occurs.

Referring now to FIG. 9, the process by which the processor 200 performs the above-described measurements and parameter control is described. Initially, in step 500, a ShownSignal variable which corresponds to the signal presently on the display 30, is assumed to be invalid. The ShownSignal variable, like other variables described hereinafter, comprises the measured characteristics contained in the characteristic description field (see FIG. 4 and Table I above).

Thereafter, in step 502, the control parameters of the video signal interface system 10 are set up in accordance with default tuning adjustments. In this way, am "invalid" video input signal (i.e., the absence of a video signal) still causes the system hardware to be set in order to prevent objectionable display artifacts. Thereafter, a loop 504 is continuously repeated. Initially, in a step 506, a CSignal variable is set in accordance with measured characteristics of the most recently processed computer video signal. In step 508, a BSignal variable is set in accordance with measured characteristics of the most recently processed broadcast video signal.

In step 510, a NewSignal variable is set equal to the CSignal variable, in accordance with an assumption that a computer video signal is to be displayed. According to steps 512, if the user has specified a preference that a broadcast video signal be displayed and a valid broadcast video signal is being received by the interface system 10, then the NewSignal variable is set equal to the BSignal variable. Thus, after steps 512, the NewSignal variable contains information regarding a computer input video signal or a broadcast input video signal, depending on the received signal type and whether the user prefers to display one such video signal type over the other.

Conditional code 516 is performed when the displayed signal, or ShownSignal variable, does not match the NewSignal variable. In the event that the ShownSignal variable differs significantly from the NewSignal variable, then the ShownSignal variable is specified to be the NewSignal variable in step 518 and a FoundTuning variable is set to be false, indicating that stored tuning adjustments have not been found for this signal in one of the tables 250, 252 (FIG. 4).

Thereafter, in sub-loop 522, the measurement table 252 (i.e., SavedList) is accessed. Specifically, for each entry $260_1$–$260_M$ in the measurement table 252, steps 524 are performed in which it is determined whether the displayed signal (i.e., the ShownSignal variable) matches the characteristic description portion $256_1$–$256_M$ of the presently accessed table entry $260_1$–$260_M$. If the ShownSignal variable matches the table entry presently accessed, then the SignalTuning variable is set equal to the tuning adjustments associated with the presently accessed entry (i.e., SavedSignal.Tune). Thereafter, the FoundTuning variable is set true, indicating that stored tuning adjustments have been found.

In subsequent steps 530, if no match has been found in the measurement table 252, then sub-loop 534 is performed in which the factory table 250 (i.e., FactoryList) is accessed. Specifically, in sub-loop 534, entries $254_1$–$254_N$ of the factory table 250 are accessed and it is determined whether the ShownSignal variable matches the characteristic description field $256_1$–$256_N$ of the presently accessed entry $254_1$–$254_N$. If such a match is found, then the SignalTuning variable is set equal to the tuning adjustments associated with the presently accessed entry (i.e., SavedSignal.Tune). The factory table 250 contains a default entry which provides a match to all ShownSignal variables. Thus, there will always be a match determined in loop 534.

In step 540, a SetupHardware function is performed in which the measured signal data (i.e., the ShownSignal variable) is combined with the found tuning adjustment values (i.e., the SignalTuning variable) and such combined data is used to set up the appropriate control parameters of the video interface system 10.

Code section 550 operates when the user requests menu control. In particular, if the user requests menu control, then a UserTuning function is performed in which the previously found tuning adjustments (i.e., the SignalTuning variable) are updated in accordance with the user set tuning adjustments and the SignalTuning variable is set equal to the updated settings. The user set tuning adjustments (i.e., the SignalTuning variable) are then added to the measurement table 252 in association with the characteristic description of the presently received video signal (i.e., the ShownSignal variable). Finally, the SetupHardware function is repeated so that system control parameters are updated in accordance with the new user defined tuning adjustments.

Having described the preferred embodiments of the invention, it will be apparent to those of ordinary skill in the art that other embodiments incorporating the disclosed concepts may be used. The embodiments encompassed by the present invention should therefore not be limited to the disclosed embodiments but rather should be limited only by the spirit and scope of the appended claims.

I claim:

1. A video signal interface system comprising:
   a memory for storing a plurality of predetermined characteristics associated with predetermined video sources in a first table and for storing a plurality of measured characteristics of a first input video signal in a second table; and
   a processor for controlling measurement of a plurality of characteristics of a second input video signal, for comparing at least a portion of said plurality of measured characteristics of said second input video signal with said plurality of measured characteristics stored in said second table and for comparing said portion of said plurality of measured characteristics of said second input video signal with said predetermined characteristics stored in said first table if said plurality of measured characteristics of said second input video signal does not match said plurality of measured characteristics stored in said second table.

2. The video signal interface system recited in claim 1 further comprising:
   a display for displaying an output signal corresponding to said second input video signal; and
   at least one display control operative to control the display of said output video signal in response to at least one of said plurality of measured characteristics of said second input video signal.

3. The video signal interface system recited in claim 2 wherein said display is a flat panel display.

4. The video signal interface system recited in claim 1 wherein said plurality of measured characteristics of said second input video signal is stored in said second table if said plurality of measured characteristics of said second input video signal does not match said plurality of predetermined characteristics stored in said first table or said plurality of measured characteristics stored in said second table.

5. The video signal interface system recited in claim 1 wherein said memory additionally stores a plurality of user adjustable tuning settings associated with said plurality of predetermined characteristics stored in said first table and said plurality of measured characteristics stored in said second table.

6. The video signal interface system recited in claim 1 wherein said plurality of characteristics of said second input video signal include at least the type of video source providing said second input video signal, the polarity of VSYNC and HSYNC pulses of said second input video signal and the number of HSYNC pulses per field of said input video signal.

7. A method for processing a video signal comprising the steps of:
   receiving an input video signal from a video source;
   measuring a first plurality of characteristics of said input video signal;
   comparing said first plurality of measured characteristics to a second plurality of measured characteristics stored in a memory to determine whether said first plurality of measured characteristics matches said second plurality of measured characteristics; and
   comparing said first plurality of measured characteristics to a plurality of predetermined characteristics stored in said memory if said first plurality of measured characteristics does not match said second plurality of measured characteristics.

8. The method recited in claim 1 further comprising the step of displaying an output video signal corresponding to said input video signal.

9. The method recited in claim 8 further comprising the step of controlling the display of said output video signal in response to at least one of said first plurality of measured characteristics.

10. The method recited in claim 8 wherein said displaying step comprises the step of displaying said output video signal on a flat panel display.

11. The method recited in claim 7 further comprising the step of storing said first plurality of measured characteristics in said memory to identify said video source if said first plurality of measured characteristics does not match said second plurality of measured characteristics or said plurality of predetermined characteristics.

12. The method recited in claim 7 further comprising the step of storing a user adjustable tuning setting associated with said video source in said memory in association with said first plurality of measured characteristics of said input video signal.

13. The method recited in claim 7 wherein said step of measuring said first plurality of characteristics of said input video signal includes at least determining the type of video source providing said input video signal, determining the polarity of VSYNC and HSYNC pulses of said input video signal and determining the number of HSYNC pulses per field of said input video signal.

* * * * *